(12) United States Patent
Laracey et al.

(10) Patent No.: US 7,752,095 B1
(45) Date of Patent: Jul. 6, 2010

(54) ELECTRONIC BILL PRESENTMENT AND PAYMENT

(75) Inventors: Kevin E. Laracey, Natick, MA (US); Krishna A. Canekeratne, Westborough, MA (US); Edward J. Morgan, Needham, MA (US); Brian C. Barnes, Boston, MA (US); Ishan Birchett, Hudson, MA (US)

(73) Assignee: Siebel Systems, Inc., San Mateo, CA (US)

( * ) Notice: Subject to any disclaimer, the term of this patent is extended or adjusted under 35 U.S.C. 154(b) by 2290 days.

(21) Appl. No.: 09/602,697

(22) Filed: Jun. 24, 2000

Related U.S. Application Data

(60) Provisional application No. 60/203,411, filed on May 11, 2000, provisional application No. 60/184,879, filed on Feb. 25, 2000, provisional application No. 60/140,873, filed on Jun. 24, 1999.

(51) Int. Cl.
*G06Q 40/00* (2006.01)

(52) U.S. Cl. ............................................... 705/34
(58) Field of Classification Search .................... 705/34
See application file for complete search history.

(56) References Cited

U.S. PATENT DOCUMENTS

| | | | |
|---|---|---|---|
| 5,193,055 A | 3/1993 | Brown et al. ............... 364/406 |
| 5,220,501 A | 6/1993 | Lawlor et al. ............... 364/408 |
| 5,265,033 A | 11/1993 | Vajk et al. ................. 364/514 |
| 5,287,270 A | 2/1994 | Hardy et al. ............... 364/408 |
| 5,325,290 A | 6/1994 | Cauffman et al. .......... 364/401 |
| 5,383,113 A | 1/1995 | Kight et al. ................ 364/401 |
| 5,473,143 A | 12/1995 | Vak et al. ................... 235/380 |
| 5,657,388 A | 8/1997 | Weiss ........................... 380/23 |
| 5,671,280 A | 9/1997 | Rosen ........................... 380/24 |
| 5,677,955 A | 10/1997 | Doggett et al. ............... 380/24 |
| 5,699,528 A | 12/1997 | Hogan ......................... 395/240 |
| 5,715,399 A | 2/1998 | Bezos ......................... 395/227 |

(Continued)

FOREIGN PATENT DOCUMENTS

EP 0 921 485 A2 6/1999

(Continued)

OTHER PUBLICATIONS

Gillespie, Market Overview: Electronic Presentment and Payment.*

(Continued)

*Primary Examiner*—Richard C Weisberger
(74) *Attorney, Agent, or Firm*—Campbell Stephenson LLP

(57) ABSTRACT

In a system and method for enabling electronic bill presentment and payment and account and billing distribution, one or more intermediaries are provided to coordinate and control account and billing information transfer among multiple supplying entities and multiple recipient entities including billing portals and consolidators. The distributor provides software to the suppliers and recipients including billing portals that includes a user interface to a billable entity associated with a billing portal. The user interface presents account and billing information to the billable entity and enables payment of bills in response to receiving instructions from the billable entity. Billing information can include the combination of summary billing information and detailed billing contact information. The distributor also provides software to billing entities to expedite the gathering of billing information from the billing entities.

11 Claims, 20 Drawing Sheets

U.S. PATENT DOCUMENTS

| | | | | |
|---|---|---|---|---|
| 5,727,163 | A | 3/1998 | Bezos | 395/227 |
| 5,757,917 | A | 5/1998 | Rose et al. | 380/25 |
| 5,793,302 | A | 8/1998 | Stambler | 340/825.34 |
| 5,832,460 | A | 11/1998 | Bednar et al. | 705/27 |
| 5,875,435 | A | 2/1999 | Brown | 705/30 |
| 5,936,541 | A | 8/1999 | Stambler | 340/825.33 |
| 5,943,656 | A | 8/1999 | Crooks et al. | 705/30 |
| 5,963,925 | A | 10/1999 | Kolling et al. | 705/40 |
| 5,974,146 | A | 10/1999 | Randle et al. | 380/24 |
| 5,974,148 | A | 10/1999 | Stambler | 380/25 |
| 5,978,780 | A | 11/1999 | Watson | 705/40 |
| 6,031,625 | A | 2/2000 | Sherman et al. | 358/1.18 |
| 6,035,285 | A | 3/2000 | Schlect et al. | 705/30 |
| 6,044,362 | A | 3/2000 | Neely | 705/34 |
| 6,049,786 | A | 4/2000 | Smorodinsky | 705/40 |
| 6,052,671 | A | 4/2000 | Crooks et al. | 705/34 |
| 6,052,674 | A | 4/2000 | Zervides et al. | 705/40 |
| 6,070,150 | A | 5/2000 | Remington et al. | 705/34 |

FOREIGN PATENT DOCUMENTS

| | | |
|---|---|---|
| WO | WO98/15925 A2 | 4/1998 |
| WO | WO99/05628 A1 | 2/1999 |
| WO | WO99/07102 A1 | 2/1999 |
| WO | WO 99/10823 | 3/1999 |
| WO | WO99/13422 A1 | 3/1999 |
| WO | WO99/56219 A1 | 11/1999 |

OTHER PUBLICATIONS

Before the Federal Communications Commission, Washington, DC, 20554, FCC 98-28; In the Matter of Amendment of the Commission's Rules Regarding Installment Payment Financing for Personal Communications (PCS) Licensees; WT Docket No. 97-82, Adopted: Feb. 24, 1998; pp. 1-2; http://www.fcc.gov/Bureaus/Wireless/Orders/1998/fcc98028.html.

Oracle Corporation -World Headquarters, 500 Oracle Parkway, Redwood Shores, California, 94065; "Realizing the True Value of On-line Self-Service and E-Billing"; an Oracle White Paper; Aug. 2005; pp. 1-15.

Oracle Corporation -World Headquarters, 500 Oracle Parkway, Redwood Shores, California, 94065; "Siebel Ebilling Manager"; 2006; pp. 1-3.

Oracle Corporation -World Headquarters, 500 Oracle Parkway, Redwood Shores, California, 94065; "Siebel Easypay"; 2006; pp. 1-2.

Oracle Corporation -World Headquarters, 500 Oracle Parkway, Redwood Shores, California, 94065; "Siebel Epayment Manager"; Aug. 2005; pp. 1-3.

"MSFDC: More Software for Doing Commerce", Advanced Information Management by META Group, Inc., File 606, 4 pages, Aug. 18, 1997.

Marable, "A Test Moves Net-Based Bill Payment a Step Closer", 1 page, Feb. 8, 1997.

"Cybercash Testing Electronic Bill Presentment", Item Processing Report, vol. 8, No. 3, pp. 1-2, Feb. 13, 1997.

News Release, "Princeton TeleCom Unveils Presentment Server", Princeton TeleCom Corporation, 1 pg., Feb. 15, 1997.

PR Newswire, "CyberCash Launches PayNow Secure Electronic Check Service", 3 pgs., Jan. 27, 1997.

Hayes, "KCP&L Tries System That Lets Patrons Pay Bills Over Internet", (3 pgs.) [online], [Retrieved Oct. 7, 2002]. Retrieved from the Internet: URL:http://web.archive.org/web/19971008200148/www.cephas.com/cephas/news/article9.html.

"ACH Plays Key Role in New CyberCoin Service From CyberCash", Payments System Report, National' Automated Clearing House Association, 2 pgs., Oct. 1996.

"CheckFree Releases 'E-Bill' As Industry Studies Bill Presentment Options", Payments System Report, National Automated Clearing House Association 3 pgs., Mar. 1997.

Sirbu, "Credits and Debits on the Internet", IEEE Spectrum, pp. 23-29, Feb. 1997.

Loshin et al., "Electronic Payment System", Electronic Commerce: On-line Ordering and Digital Money, Chapter 6, pp. 169-192, 1997.

* cited by examiner

Vertical Table
(Column Descriptions) 20

| ENTITY_ID /22 | TABLE_ID /24 | COL-ID /26 | TYPE /28 | LENGTH /30 | ORDER /32 | RE-QUIRED /34 | STATE /36 | LABEL /38 | VALIDA-TION | FOR-MAT | STYLE | DISC | ETC... |
|---|---|---|---|---|---|---|---|---|---|---|---|---|---|
| Company1 | AccountInfo | c01 | CHAR | 50 | 1 | Y | Active | ACC No. | | | | | |
| Company1 | AccountInfo | c02 | CHAR | 255 | 2 | N | Active | Username | | | | | |
| Company1 | AccountInfo | c03 | Private | | 4 | N | Active | PassCode | | | | | |
| Company1 | AccountInfo | c04 | DATE | | 3 | N | Active | Birthday | | | | | |
| Company2 | BillInfo | c01 | CHAR | 255 | 1 | Y | Active | Username | | | | | |
| Company2 | BillInfo | c02 | CHAR | 255 | 3 | Y | Active | ACC No. | | | | | |
| Company2 | BillInfo | c03 | CHAR | 255 | 2 | N | In-active | PassCode | | | | | |

Variable sized and positioned table dependent forms determined at run-time

FIG. 19A

| FIG. 19A |
|---|
| FIG. 19B |

FIG. 19

ELECTRONIC BILL PRESENTMENT AND PAYMENT

RELATED APPLICATIONS

This application claims priority to and the benefit of the provisional U.S. patent application Ser. Nos. 60/140,873 filed Jun. 24, 1999, 60/184,879 filed Feb. 25, 2000 and 60/203,411 filed May 11, 2000, the entirety of which is hereby incorporated herein by reference.

TECHNICAL FIELD

The invention relates to systems and methods for electronic bill presentment and payment and electronic account information generation and distribution.

BACKGROUND INFORMATION

Electronic bill publishing and payment systems are intended to provide convenience and efficiency to both billers and their customers. Billers vary with respect to how billing information is recorded and distributed to customers. Customers vary with respect to where and how they access electronic billing information. Many different protocols and formats are used by various entities to provide interfaces and communications among and between billers and customers.

SUMMARY OF THE INVENTION

Accommodating multiple customer user interfaces, communications protocols, and account and billing information data formats can promote a larger population of electronic billers and electronic bill paying customers that participate in electronic bill distribution presentment and payment. A more streamlined and less costly approach to providing electronic bill presentment and payment functionality can unite larger populations of participating electronic billers and electronic bill paying customers.

The invention relates to systems and methods for enabling electronic bill presentment and payment and electronic account information generation and distribution. In general, the invention involves the use of one or more account and billing information distributors that coordinate and control the generation and distribution of account and billing information multiple participants such as account providers, suppliers, banks, billing portals and consolidators. The distributor provides software to the account and billing information retailers such as billing consolidators, banks and portals that includes a user interface to a bill paying customer or end user associated with a billing portal. The user interface presents account and billing information to the bill paying customer or end user processed by the distributor and effects payment of bills in response to receiving instructions from a customer. Billing information can include the combination of summary billing information and detailed billing contact information. The distributor also provides software to account providers to expedite the generation of electronic account and billing information from the billing entities.

In one embodiment of the invention, a customer acting as a billing portal end user, directs the distributor through the distributor provided user interface to retrieve associated account and billing information from an associated set of account providers or billers. The provided software requests one or more participant suppliers of to identify and supply account and billing information of all account providers associated with and requested by the user.

In one embodiment of the invention, the distributor-retrieved account and billing information is the combination of summary billing information and detailed billing contact information. In another embodiment, the distributor supplies software to the billing portal that provides a user interface with the billable entity for presentment of billing information and payment of bills and for registering the billable entity as a user of the services provided by the distributor through the billing portal.

In another embodiment, the invention entails a method of supplying billing information to a billable entity associated with a billing portal including the steps of supplying software to a billing portal from a supplier where the information content of the software being independent of any attribute of the billing portal except for the presence of enabled communication functionality at the billing portal to enable communication between the billing portal and the billable entity and between the billing portal and the supplier of said software and the software interacting with the billable entity as a user interface to determine prior registration of the billable entity and to perform registration if said prior registration has not occurred and the software communicating with the billable entity as a user interface to receive account and billing information from the supplier that the software provides to the billable entity.

According to one embodiment, the invention entails a computerized method of providing billing information, including the steps of (a) receiving, over a communications network, a request for at least summary billing information that is automatically generated by a billing portal in response to an action by a billable entity associated with the billing portal, (b) requesting, over the communications network in response to step (a), at least the summary billing information from a supplier of the summary billing information, (c) receiving, over the communications network, at least the summary billing information from the supplier of the summary billing information; and (d) transmitting, over the communications network to the billing portal, at least the summary billing information and detailed billing contact information, the detailed billing contact information for allowing the billable entity to access detailed billing information from a supplier of the detailed billing information.

In another aspect the method further includes, prior to step (a), providing software to the billing portal that in response to an action by a billable entity associated with the billing portal, exclusively directs the performance of actions of the billing portal to transmit a request for at least summary billing information associated with step first receiving step and to receive at least the summary billing information and the detailed billing contact information associated with step (d). In a further aspect, where the step of providing software comprises the steps of transmitting, over the computer network, the software to the billing portal to effect delivery and installation of the software. In a further aspect, where the delivery, installation and operation of the provided software is automatic with respect to other human and machine activity at the billing portal. In a further aspect where the software is embodied as one contiguous portion of dynamic HTML or embodied as one contiguous portion of JavaScript or where the software is uncompressed and contiguously embodied in less than 80 bytes of information.

In another aspect, the detailed billing contact information comprises a Uniform Resource Locator (URL) that directs access to the detailed billing information located on the Internet network. In a further aspect, the method of claim 8 wherein the detailed billing contact information comprises an encrypted Uniform Resource Locator (URL) that authenticates the identity of the billable entity accessing information addressable by the Uniform Resource Locator.

In another aspect, prior to step (b), providing software to the supplier of summary billing information that in response to a request for summary billing information in step (b), directs the supplier to transmit over a communications network summary billing information in step (c).

In another embodiment, the invention entails a computerized method of providing billing information, including the steps of (a) receiving, over a communications network, a request for at least summary billing information automatically generated by the billing portal in response to an action by a billable entity associated with the billing portal; (b) requesting, over the communications network in response to step (a), at least the summary billing information from a supplier of the summary billing information, (c) receiving, over the communications network, at least the summary billing information from the supplier of the summary billing information in at least a first one of a plurality of different data formats and translating the first data format into a predetermined data format; and (d) transmitting, over the communications network to the billing portal, at least the summary billing information in the predetermined data format and detailed billing contact information for allowing the billable entity to access detailed billing information from a supplier of the detailed billing information.

In another embodiment, the invention entails a computerized method of providing billing information, including the steps of (a) receiving, over a communications network, a request for at least summary billing information associated with a billable entity from a billing consolidator; (b) requesting, over the communications network in response to step (a), at least the summary billing information from a supplier of the summary billing information, (c) receiving, over the communications network, at least the summary billing information from the supplier of the summary billing information in at least a first one of a plurality of different data formats and translating the first data format into a predetermined data format; and (d) transmitting, over the communications network to the billing consolidator, at least the information requested in step (a) in the predetermined data format.

In another aspect of this embodiment, prior to step (a), providing software to the billing consolidator that directs the performance of actions of the billing consolidator to receive at least the summary billing information transmitted in step (d). In a further aspect, where step (a) further includes receiving a request for detailed billing contact information associated with a billable entity. In a further aspect, step (b) further comprises requesting detailed billing contact information associated with a detailed billable entity. In a further aspect, step (a) further comprises requesting billing information associated with multiple billable entities and step (d) comprises transmitting billing information associated with multiple billable entities. In a further aspect, step (a) is planned by the billing consolidator to occur on a scheduled basis. In a further aspect, step (a) is planned by the billing consolidator to occur on a periodic basis.

In another embodiment, the invention entails a system for providing billing information, that includes a host computer for communicating over a communications network with a portal and a supplier of summary billing information, a software program including an applications programming interface enabling other software to direct behavior of the software program in a programmable manner, the software program adapted for executing on the host computer to receive a request for at least summary billing information over the communications network from the billing portal, request at least the summary billing information over the communication network from the supplier of the summary billing information in response to the received request from the billing portal, receive at least the summary billing information over the communications network from the supplier of the summary billing information and transmit at least the summary billing information and detailed billing contact information over the communications network to the billing portal where the detailed billing contact information allowing the billable entity to access detailed billing information as presented from a supplier of the detailed billing information.

In a further aspect of this embodiment, where the behavior of the software program is directed by other software executing locally with respect to the software program or where behavior of the software program is directed by other software executing remotely with respect to the software program. In a further aspect, where the software program is adapted to be stored onto computer readable media. In a further aspect the software program is adapted to be packaged and copied by a software manufacturer and purchased separately by each of a plurality of operators of the system.

In another embodiment, the invention entails a method of supplying billing information to a billable entity associated with a billing portal including the supplying software to a billing portal from a supplier where the information content of the software being independent of any attribute of the billing portal except for the presence of enabled communication functionality at the billing portal to enable communication between the billing portal and the billable entity and between the billing portal and the supplier of said software and the software interacting with the billable entity as a user interface to determine prior registration of the billable entity and to perform registration if said prior registration has not occurred and the software communicating with the billable entity as a user interface and receiving account and billing information from the supplier that the software provides to the billable entity.

These and other features, advantages, and aspects of the invention will become more apparent from the following description.

DESCRIPTION

Figure 1:
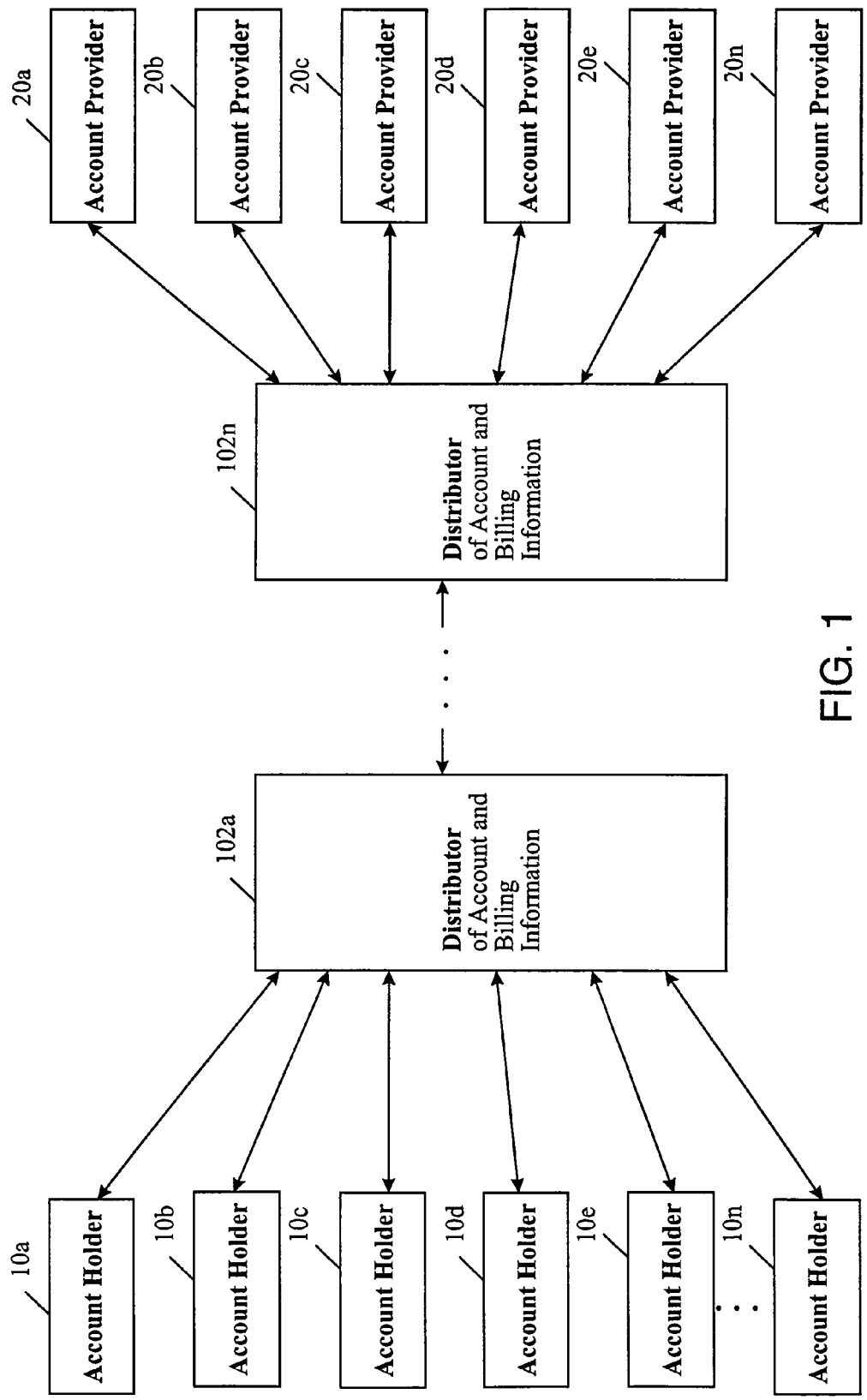
FIG. 1 is an illustrative block diagram depicting one or more account and billing information distributors processing and transferring account and billing related information between one or more account providers 20a-n and one or more account holders.

FIG. 1 is an illustrative block diagram depicting one or more account and billing information distributors 102a-n processing and transferring account and billing related information between one or more account providers 20a-n and one or more account holders 10a-n. Account providers are also referred to as billing entities, billers and bill providers. Account holders are also referred to as customers, billable entities, bill payers and constitute one type of end user of transferred account and billing information.

Account and billing related information can include the information content of actual bills printed and mailed to customers as account holders 10a-n by account providers 20a-n. Account providers 20a-n include telephone, utility or credit card companies. Account and billing related information can also include information related to its secure distribution and delivery to its intended destination. The intended destination can be to one or more end users. An end user 126, can be a joint or exclusive account holder 10a-n, an agents of an account holder, customer service or law enforcement personnel or any person with authorization to access the account and billing information associated with one or more accounts provided by account providers 20a-n.

Secure distribution and delivery of this information electronically encoded involves enforcing controlled access among all participants, including entities that originate it, participate in it's distribution and ultimately receive it's delivery. Account and billing related information can include information identifying and authenticating any participant and identifying the types of relationships between participants and between those participants and the transferred information. Such related information can also identify permissions or restrictions between a participant and portions of account and billing information associated with other participants.

Figure 2:
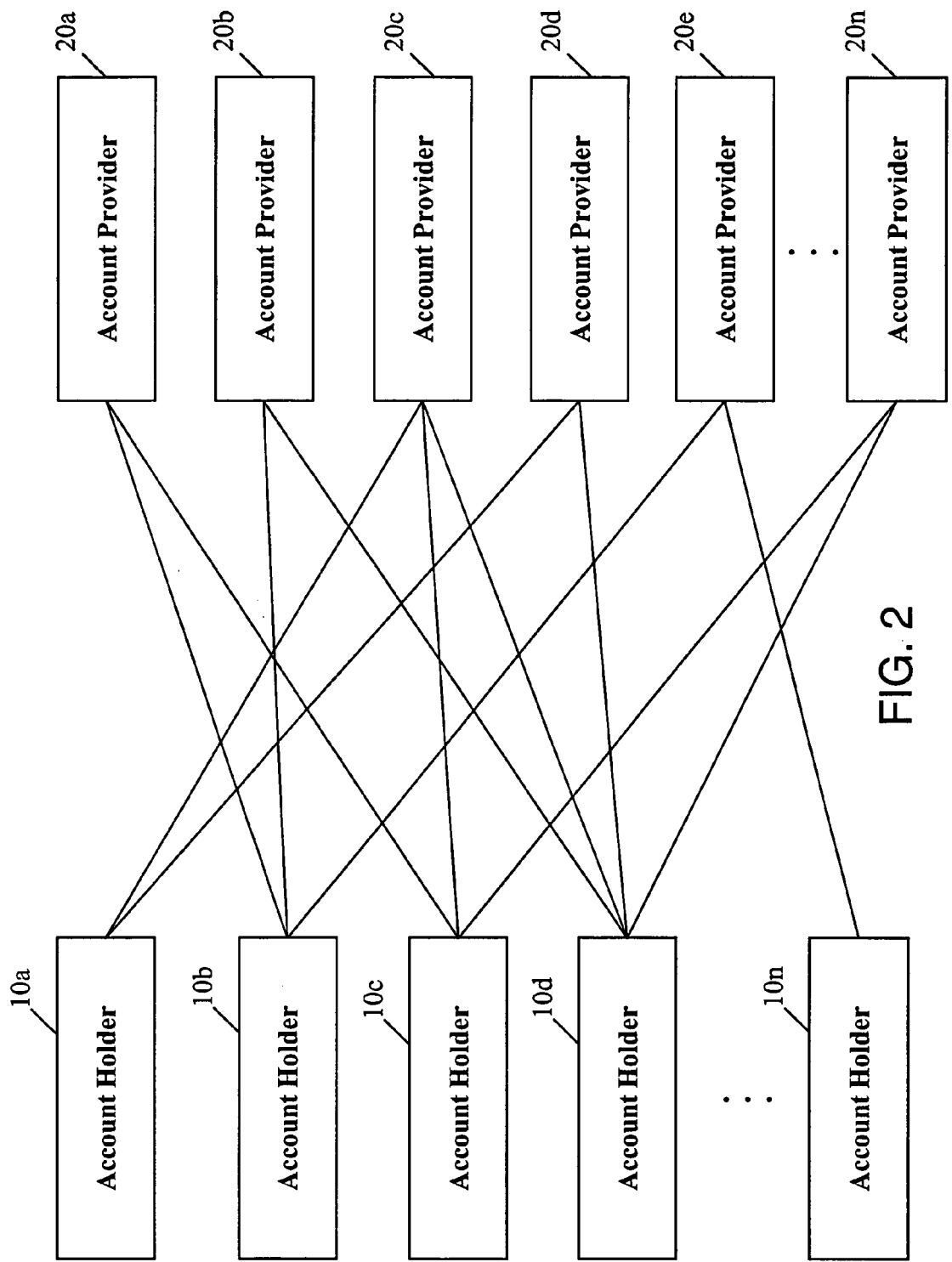
FIG. 2 is an illustrative block diagram depicting the many to many relationships between account providers and account holders.

FIG. 2 is an illustrative block diagram depicting the many to many relationships between account providers 20a-n and account holders 10a-n. Each account holder 10a-n holds accounts with an independent set of account providers 20a-n. Each account provider 20a-n has provided accounts for a independent set of account holders 10a-n. In practice, each account provider 20a-n or biller can establish thousands of accounts with account holders 10a-n as customers. In practice, each account holder 10a-n can typically have one or accounts each established with a different account provider 20a-n. This figure shows the presence or absence of an account relationship between a small sample of five account holders 10a-n, and a small sample of six account providers 20a-n.

In this figure, account holder 10a has an account with two account providers 20c and 20d. Account holder 10b has an account with three account providers 20a, 20b, and 20e. Account holder 10c also has an account with three account providers 20a, 20c, and 20n. Account holder 10d has an account with four account providers 20a, 20b, 20c, and 20n. Account holder 10n has an account with only one account provider 20e.

Account provider 20a has accounts with two account holders 10b and 10c. Account provider 20b has accounts with two account holders 10b and 10d. Account provider 20c has accounts with account holders 10a, 10c, and 10d. Account provider 20n has accounts with two account holders 10c and 10d.

A distributor 102 can process and transfer information associated with at least thousands of account holders 10a-n and at least thousands of account providers 20a-n. An account provider 20a-n, may have no established accounts nor any association with a majority of account holders 10a-n known by the distributor 102. Likewise, an account holder 10a-n, may have no established accounts nor any association with a majority of the account providers 20a-n associated with the distributor 102.

The distributor 102 records these unique associations between account providers 20a-n and account holders 10a-n when registering account providers 20a-n and account holders as participants 546a and 546b during the registration of each of these types of participants with the distributor 102.

Figure 3:
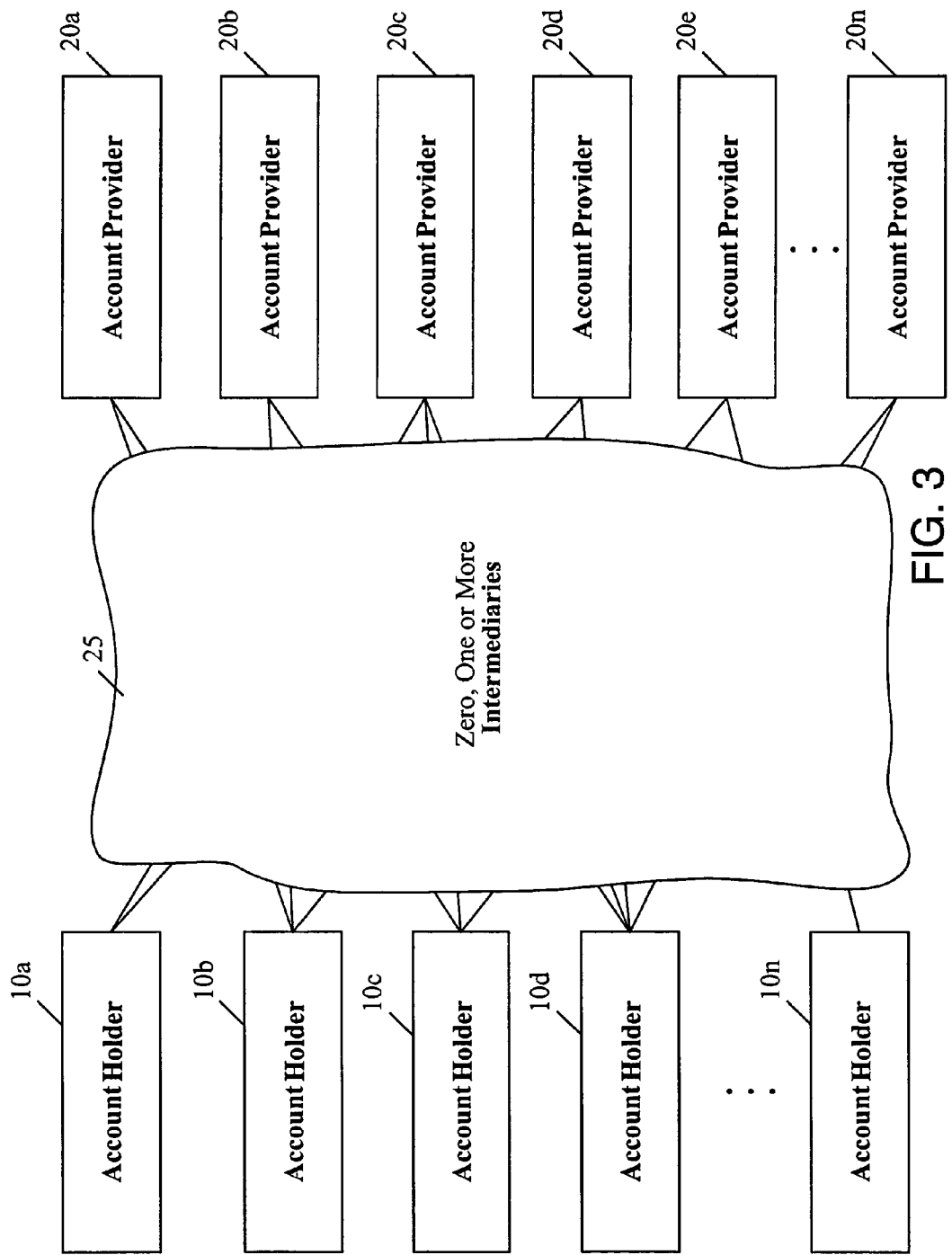
FIG. 3 is an illustrative block diagram depicting the role intermediaries play in transferring information between account providers and account holders for the purpose of electronic bill payment.

FIG. 3 is an illustrative block diagram depicting the role intermediaries 25 play in transferring information between account providers 20a-n and account holders 10a-n for the purpose of electronic bill payment. Traditionally, existing intermediaries 25 are billing information service providers, referred to as consolidators or portals, which attempt to combine information from multiple billers and/or provide electronic bill payment services to bill payers. These intermediaries 25 are proprietary service providers that often compete amongst each other for access to billing information and for the patronage and loyalty of bill payers as their electronic bill paying customers. As a matter of efficiency and convenience, each account holder 10a-n would prefer to pay all bills associated with all his accounts in one convenient place and manner. Likewise, each account provider 20a-n would prefer to bill all account holders 10a-n using one efficient and uniform method. Without the use of an intermediary 25, each account holder 10a-n must electronically pay each biller using the place and method provided by each biller. This defeats the purpose of providing a convenient alternative to paying bills by mail. With the use of intermediaries 25, account providers 20a-n are forced into interfacing with one or more intermediaries 25 to reach convenience searching account holders 10a-n. Each intermediary 25 is limited with respect to the account holders 10a-n that they server and each operating with a proprietary method unique to that intermediary 25. This creates a fragmented network of intermediaries 25, account providers 20a-n and account holders 10a-n.

A distributor 102 is a new type of intermediary 25 that can be sold in volume as a software product to numerous independent operators. Distributors 102 can be flexibly configured, organized and grouped into networks that scale beyond the capacity and scope of existing proprietary service provider.

Figure 4:
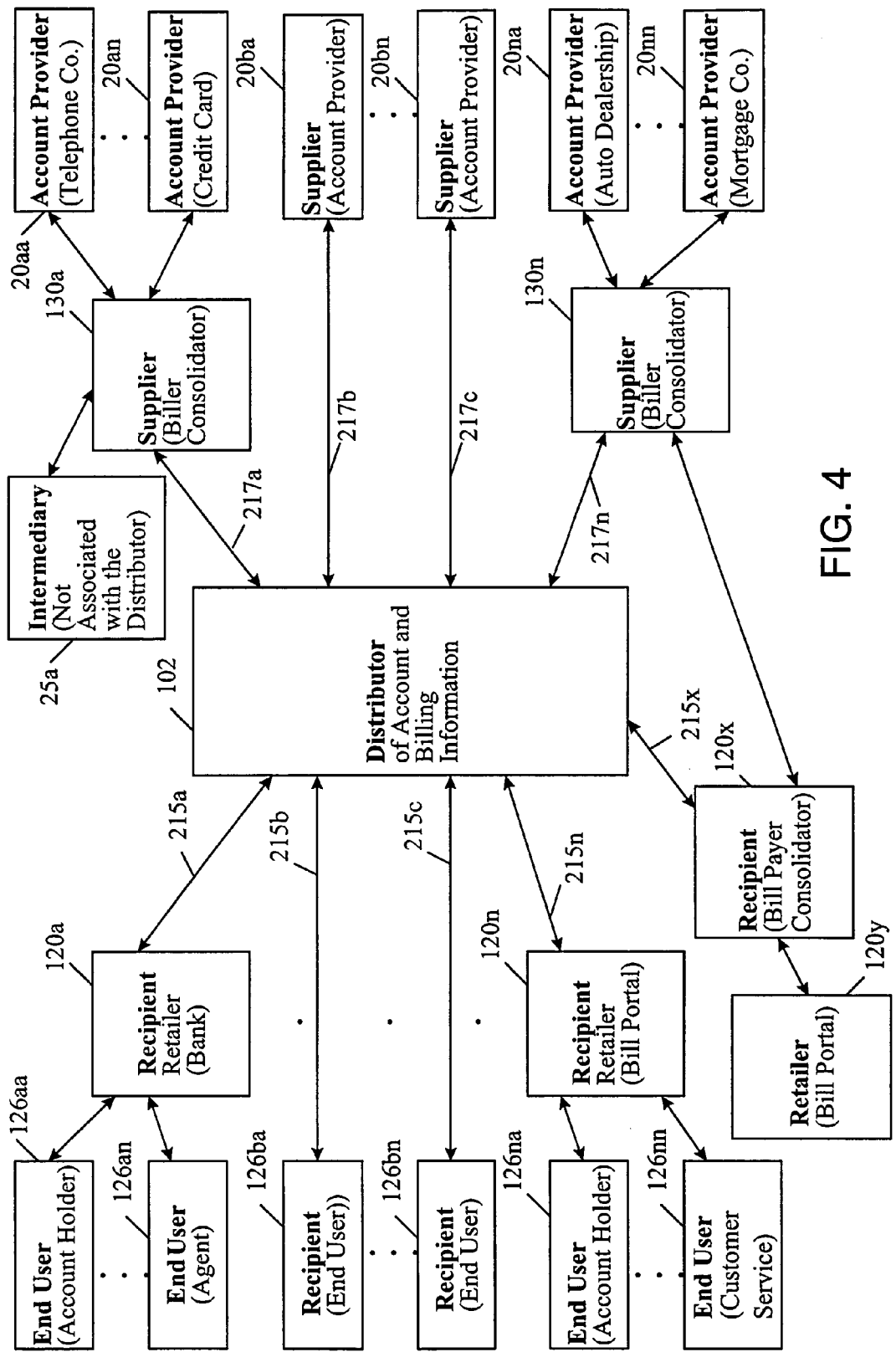
FIG. 4 is an illustrative block diagram depicting one embodiment of the information distributor 102, operating as an intermediary securely transferring account and billing related information between various other intermediaries such as suppliers and recipients.

FIG. 4 is an illustrative block diagram depicting one embodiment of the information distributor 102, operating as an intermediary 25 securely transferring account and billing related information between various other intermediaries 25 such as suppliers 130a-n and recipients 120a-x. Intermediaries 25 can form a network of nodes connecting end users such as account holders 10a-n with originators of the account and billing information such as account providers 20a-n. In other embodiments, multiple distributors 102 can be participate as intermediaries 25 whether in direct or indirect communication.

The terms "supplier" 130a-n and "recipient" are classifications of participants with respect to their relationship to the distributor 102. A supplier 130a-n, also referred to as a source of account and billing information, directly communicates with and supplies account and billing information to the distributor 102 and a recipient 120a-n directly communicates with and receives billing information from the distributor 102. Suppliers 130a-n can include account providers 20a-n who originate the account and billing information and those intermediaries 25 that directly transfer it to a distributor 102. Sources include all entities that have such information whether or not they are in direct communication with a distributor 102. Recipients 120a-x can include banks, bill portals and a bill payer consolidators and end users themselves. A retailer is an intermediary 25 that directly interfaces with and provides account and billing information to end users 126 A retail recipient 120 is a recipient that directly interfaces with end users. In some embodiments, one or more intermediaries 25 exchange information with a distributor 102 and can act as both a supplier 130a-n and a recipient with respect to that distributor 102. A bill payer consolidator or billing consolidator is a retailer that may exclusively control many of its own bill payer or billing portals.

Account providers 20aa through 20an supply information to supplier 130a which is classified as a biller consolidator. Account providers 20na through 20nn supply information to supplier 130n, also a biller consolidator. Both suppliers 130a and 130n directly transfer information to the distributor 102 via communications channels 217a and 217n respectively. Supplier 130n also transfers information to the non-retail recipient 120x in addition to the distributor 102. This information is probably accessible to the distributor 102.

Account providers 20ba through 20bn originate and directly transfer information to the distributor 102 via communications channels 217b and 217c respectively and are consequently classified as suppliers with respect to the distributor 102.

The distributor 102 transfers information to two retail recipients 120a and 120n via communications channels 215a and 215n respectively and to one non retail recipient 120x via the communications channel 215x. The distributor 102 directly transfers information to end users 126ba through 126bn. These end users 126ba through 126bn are consequently classified as recipients with respect to the distributor 102.

The distributor 102 is a configurable and programmable product for sale that can act as a node in a network of existing intermediaries 25 or as a node into a network containing only distributor 102 nodes. The distributor 102 provides operational flexibility and independence beyond what is currently provided by service provider intermediaries 25. Generally, the distributor 102 processes transferred information by performing communicated information reception, communications protocol and data format translation, data storage, data account aggregation, and re-transmission. All information is communicated in a secure manner using secure socket layer or other types of secure network communication. Each distributor 102 can be uniquely configured and placed within a network of intermediaries 25 to expand the scope and functionality of account and billing information transfer services provided to billers and end users.

Service providers provide services, not products to be used by other independent operators to perform similar services. Conversely, the distributor 102 provides a method and apparatus for many other independent operators to provide new functionality and scale the account and billing information transfer services provided far beyond the capability and motivations of any one service provider.

The distributor 102 performs reception of information from suppliers 130a-n communicated in one of many possible communications protocols and data formats. It optionally translates the received information into another data format for storage and/or into another communications protocol and data format for re-transmission to a recipient. Such translation is performed by communication protocol software modules called cartridges, each which perform the execution of a communications protocol for reception or transmission functionality provided by distributor 102.

The distributor 102 can perform aggregation of account and billing information based upon its association with particular account holders 10a-n. It can also perform account aggregation of information received from multiple suppliers 130a-n so that all information associated with one account holder 10a-n across all associated account providers 20a-n can be organized, consolidated, and presented to an account holder 10a-n as an end user.

The distributor 102 can perform reception and re-transmission without providing long term storage of the transferred information or can provide storage for later re-transmission based upon recipient demand or upon a schedule for transmission with one or more recipients.

The distributor 102 transmits all information to participants in a secure manner. To transmit securely, each participant must be pre-registered with the distributor 102 and authenticated by the distributor 102 upon transmission. Furthermore, the recipient must have permission, as indicated by the distributor records 546b, to receive the information to be transmitted. For example, a particular account provider 20a-n may not permit a particular recipient such as a bank, bill portal or bill payer consolidator to be in possession of its billing information. A bill payer consolidator is also referred to as a billing consolidator. Participant entity relationship information gathered during initial registration and/or later update registration, would indicate lack of permission. Consequently, the distributor 102 would not transmit such information to the un-permitted participant.

Participants are entities that also include account providers 20*a-n*, account holders 10*a-n* referred to as end users and any intermediary 25 entity. An intermediary 25 is any entity involved with transfer of account and billing information between the account provider 20*a-n* and account holder 10*a-n*. End users can be one or more account holders 10*a-n* associated with a particular account, their associated agents and any other entity permitted to access account holder 10*a-n* related billing information. Supplying entities, or suppliers 130*a-n*, provide billing related information to an information distributor 102. A supplier 130*a-n*, can be an actual account provider 20*a-n* or biller such as an electric power utility company, a permitted agent of the account provider 20*a-n* such as a biller consolidator, or any permitted non-biller entity that can supply such information associated with one or more billers, such as the electric power utility company. Each supplier 130*a-n* can supply billing related information associated with one or more account holders 10*a-n* and one or more billers to the distributor 102 by transmitting it on demand, on availability or on a scheduled basis.

Recipients receive account and billing related information from a supplier 130*a-n* or information distributor 102. A recipient can be an end user actual account holder 10*a-n* who pays debts associated with an account such as an individual consumer. Or a non paying end user such as a customer service representative. Alternatively, the recipient can be another intermediary that transfers the received information either directly or indirectly to the end user. This type of recipient can be a bank, a bill portal or a bill payer consolidator. Information can be transferred between the supplier and distributor or between the distributor 102 and the recipient upon demand, upon availability or on a scheduled basis.

Figure 5:
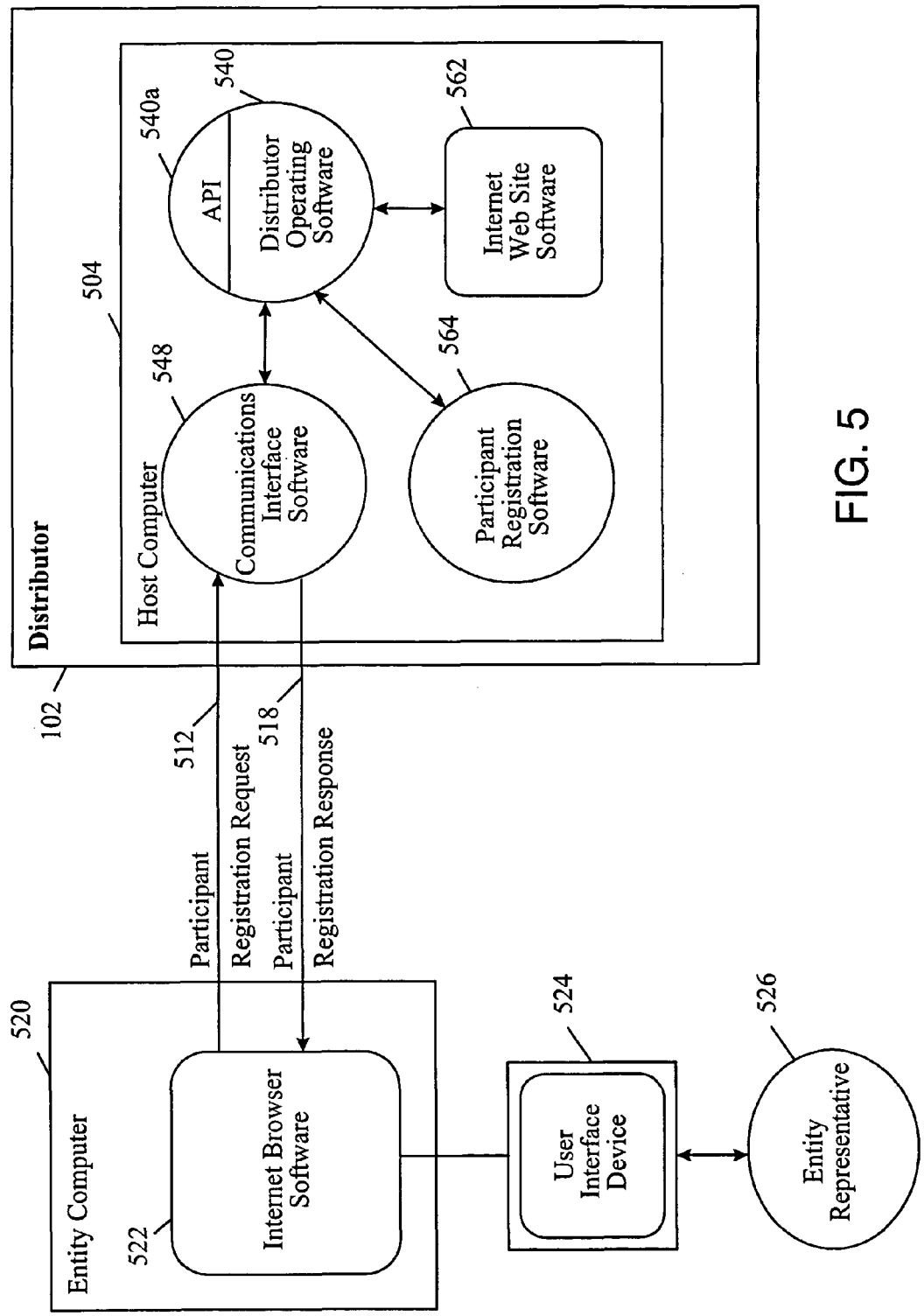
FIG. 5 is an illustrative block diagram depicting an entity registering as a participant within the scope of operation of one or more distributors.

FIG. 5 is an illustrative block diagram depicting an entity registering s a participant with a distributor 102. A participant can be an account provider 20*a-n*, a supplier 130*a-n*, a recipient 120*a-n*, an end user 126 or any entity that is operates with the scope of operation of the distributor and that is required to be identified and authenticated by the distributor 102 to ensure secure operation of the distributor 102. Registration is required as a pre-requisite to inter-operate or to receive service from the distributor 102.

The distributor 102 provides an Internet Web site for access by entities interested in registering as participants. The entity representative 526 selects a participant role for which to register. The Participant Registration software 564 and the Internet Web Site software 562 communicate an application to register the entity. This application is embodied in one or more Web pages containing required and optional questions and empty information fields to be completed by the entity. The browser software 522 displays communicated information via the user interface hardware 524 and transfers information between the entity representative 526 and the distributor 102.

The information required is based upon on the type of participant role applied for by the entity. The entity's interaction with the Web application during registration is represented by the participant registration request 512. The distributor's 102 decision upon receiving the request 512 is represented by the participant registration response 518. This structure, content and timing of this response depends upon the type of participant role applied for by the entity.

Figure 11:
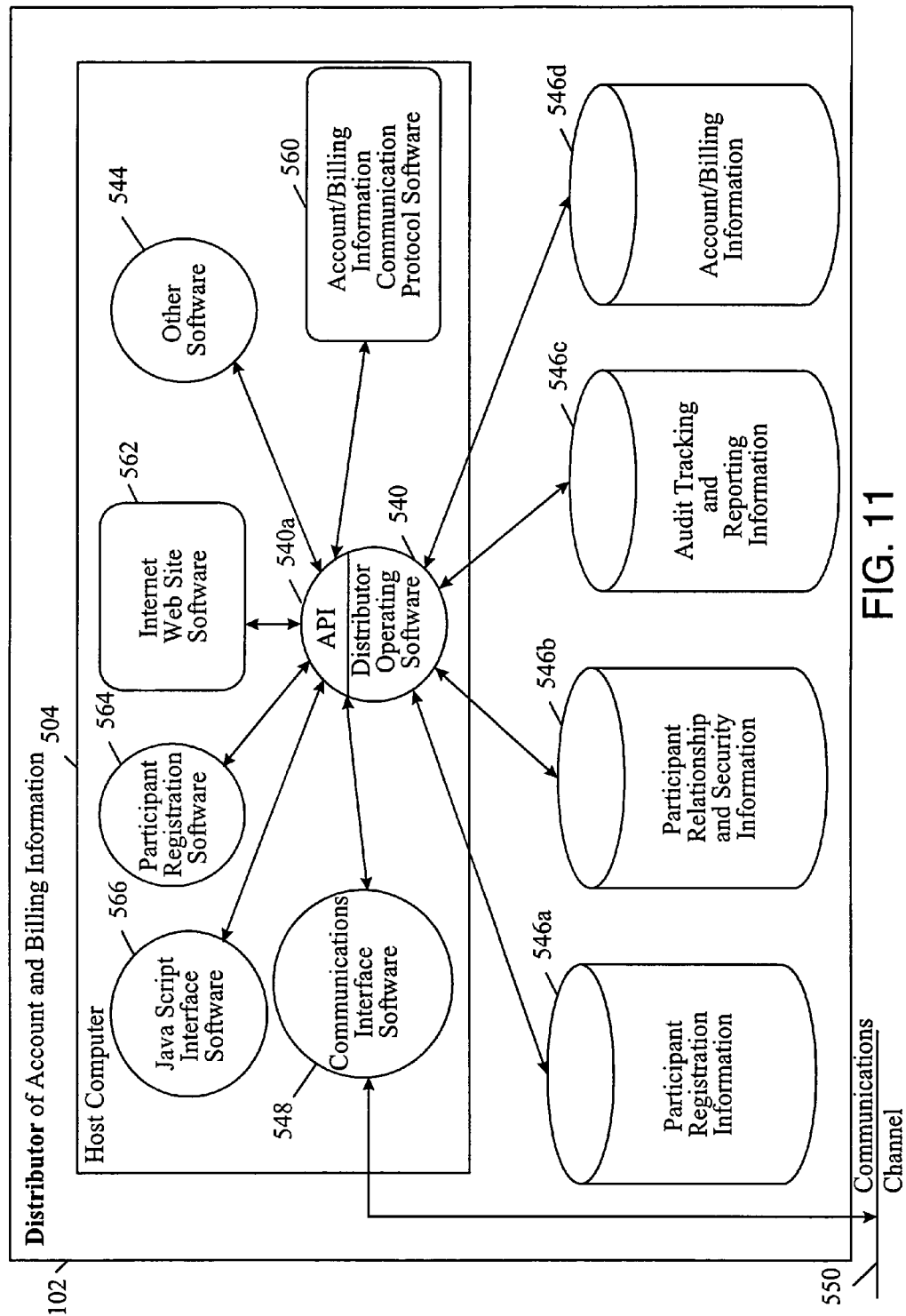
FIG. 11 is an illustrative block diagram depicting an embodiment of internal hardware and software components and the distributor.

Both distributor software components 564 and 562 make use of the Distributor Operating software 540 and the Communications Interface software 548 described in FIG. 11. All software executes on the host computer 504.

Figure 6:
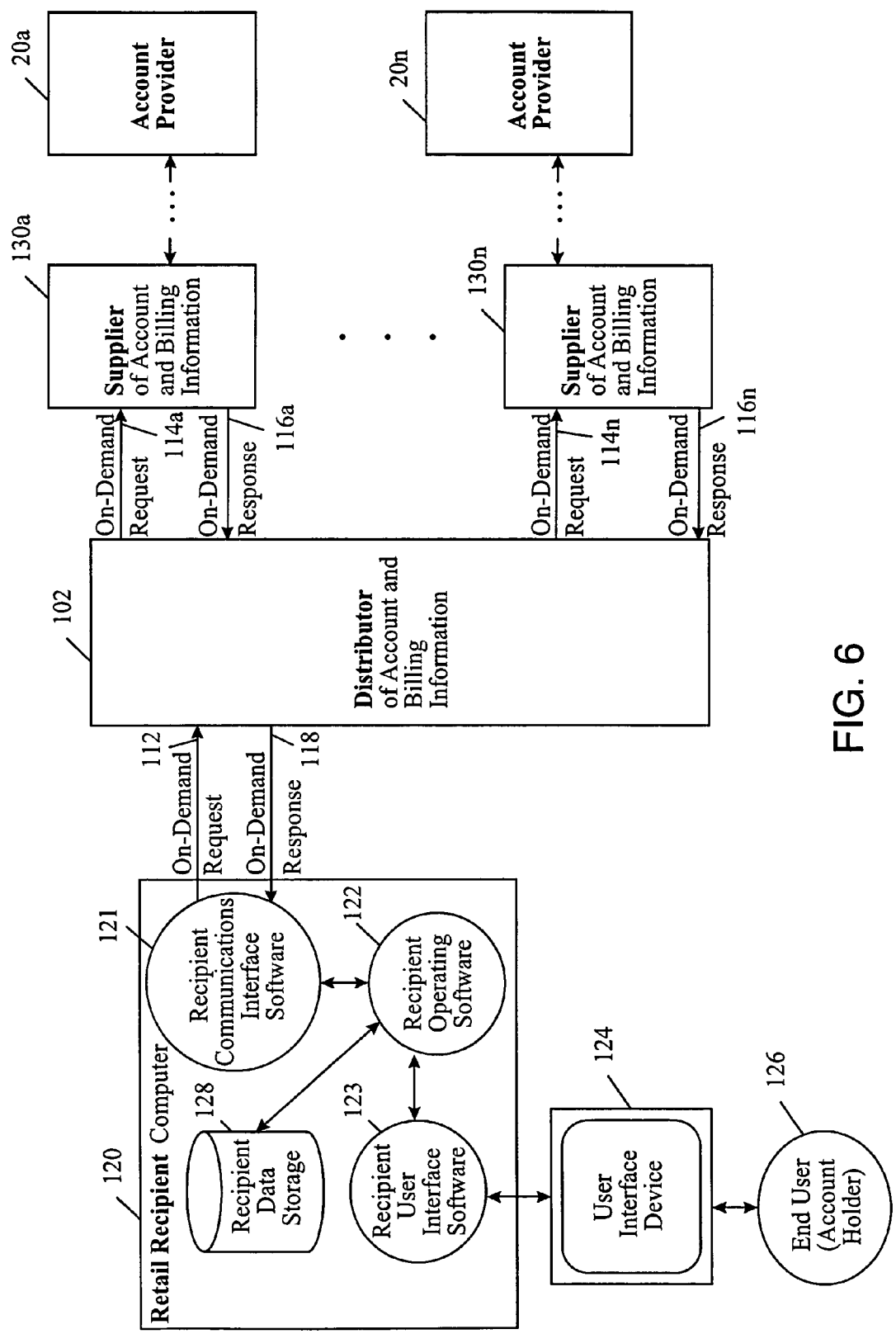
FIG. 6 is an illustrative block diagram depicting the transfer of account and billing related information from a supplier 130a-n to a distributor, to a retail recipient computer. A retail recipient interfaces directly with one or more end users.

FIG. 6 is an illustrative block diagram depicting the transfer of account and billing related information from a supplier 130*a-n* to a distributor 102, to a retail recipient computer 120. A retail recipient 120 interfaces directly with one or more end users. The distributor 102 receives account and billing information from at least one supplier 130*a-n* and supplies account and billing information to at least one recipient 120. The distributor system and method generally include interactions among an distributor 102, at least one recipient 120, and at least one supplier 130*a-n*. Each of the suppliers 130*a-n* has, or has access to, account and billing information.

An account holder 10*a-n*, acting as an end user of the retail recipient 120, also is involved. This end user participant is illustratively a person with one or more accounts established with one or more account providers 20*a-n* or billers. A biller can be for example, a utility, a retailer, a credit card company, a taxing authority, or any entity that subjects the account holder end user 126 to a debt that can be tracked by an account. A supplier 130 is typically a biller, or can be a separate entity.

The retail recipient 120, such as a billing portal, bank or consolidator is a facility that provides an end user such as an account holder 10*a-n* with a mechanism to view accounts and to pay debts owed to various associated account providers 20*a-n* or billers. The retail recipient 120 provides one convenient alternative for the viewing accounts and payment of account related debts from one or more locations. This facility includes retail recipient software 121-123 whose functionality includes providing a user interface via user interface software 123 and hardware 124 to the end user. In this embodiment, the recipient data storage 128 excludes an inventory of account and billing information.

Note that in this embodiment, the manner in which the retail recipient facility 120 interfaces with the end user 10*a* is completely independent of the design of the distributor 102. For this embodiment, the distributor only supplies requested information on demand from the recipient 120. The distributor neither knows nor cares about how the recipient 120 interfaces with its end user 126. Other embodiments enable the distributor 102 to provide and control the interface to the end user 126.

This user interface device 124, can include graphics and text input/output device hardware that is exercised by user interface software 123 residing as part of the retail recipient software 121-123. The end user 126 communicates a directive to the retail recipient 120 to view account and billing information by performing a predetermined action while exercising the user interface 124. For example, this action could include clicking a mouse pointer on a particular graphical icon representing account and billing information to be displayed on the user interface 124. This interface could be a Internet, intranet or extranet Web browser.

In this illustrative embodiment, the recipient and the distributor 102 both request and receive information on demand, as opposed to receiving information on schedule or on availability from the information transmitter. Upon the performance of such an action by the end user 126, the retail recipient 120 communicates a request 112 for account and billing information associated with and requested by the end user over a communications channel, such as a computer network which can be the Internet and/or some other private or public communications medium, to the distributor 102.

The distributor 102 responds to this request by verifying that the retail recipient 120 and the end user 126 have registered with the distributor 102, by authenticating the identity of both the retail recipient 120 and the end user 126, by determining what suppliers of account and billing information 130a-n registered with the distributor 102 supply account and billing information associated with and requested by the end user 126, communicating a request 114a-n for the account and billing information to those registered and associated suppliers 130a-n of account and billing information, and optionally receiving a response 116a-n from the registered and associated suppliers of account and billing information 130a-n over respective communications channels.

Each response from a supplier 130a-n of account and billing information should contain the latest account and billing information available to the supplier 130a-n and requested by the distributor 102. The distributor 102 then aggregates the account and billing information content of all responses received from end user associated suppliers 130a-n of account and billing information and communicates this aggregated information in a response 118 over a communications channel to the retail recipient 120.

In one embodiment, this response includes all aggregated summary account and billing information 800 and in addition includes detailed billing contact information 1612 associated with each supplier of detailed billing information 130a-n. In other embodiments, this response can include all summary 800 and detailed 900 account and billing information.

The retail recipient 120 then receives a communicated response 118 from the distributor 102 and processes the information via the retail recipient software 121-123 to communicate the requested account and billing information to the end user 126 via the user interface 124.

Figure 7:
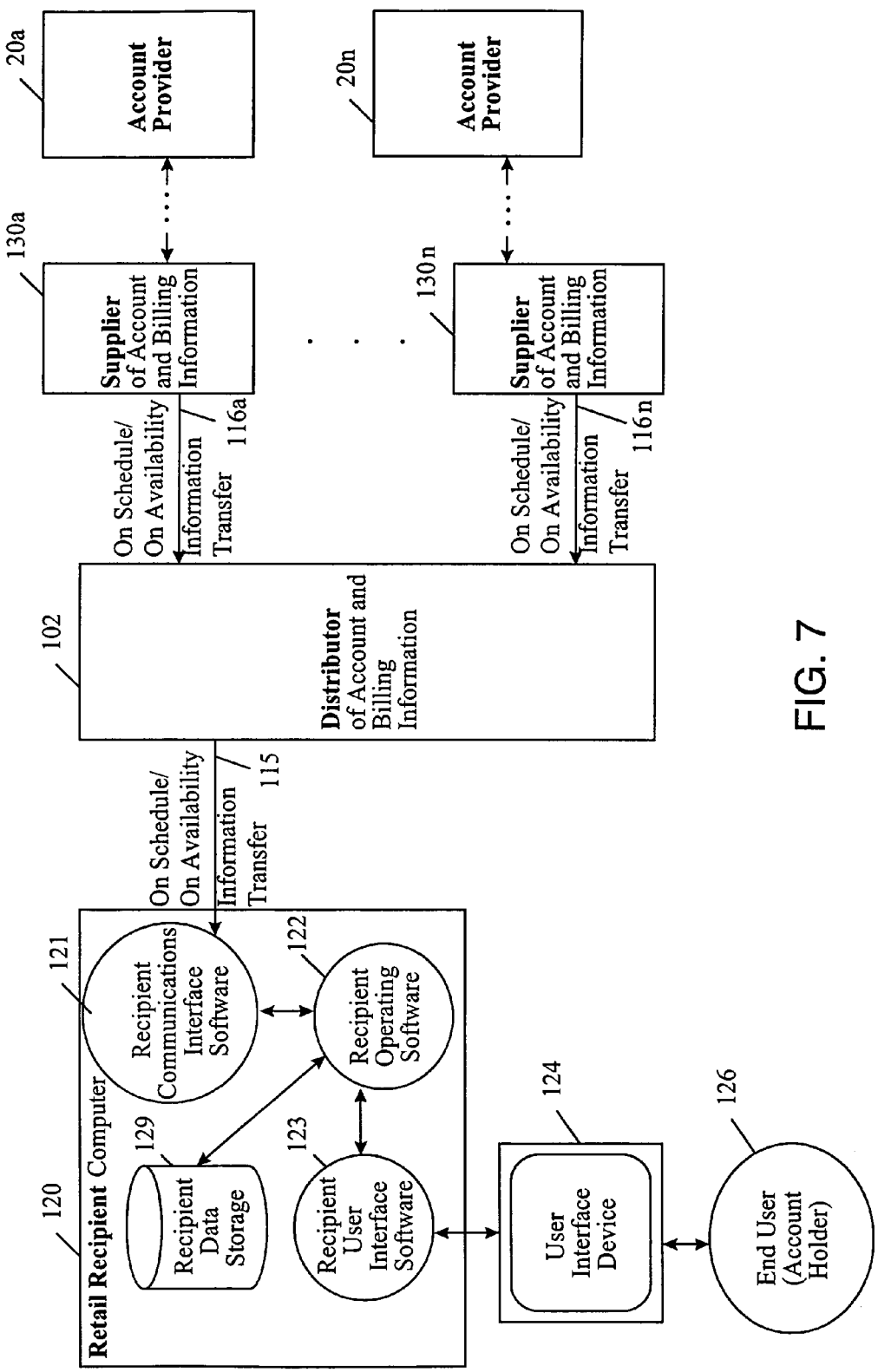
FIG. 7 is an illustrative block diagram depicting the retail recipient 120 receiving account and billing information on a scheduled, accommodation or on an availability basis and storing it into local storage.
Figure 9:
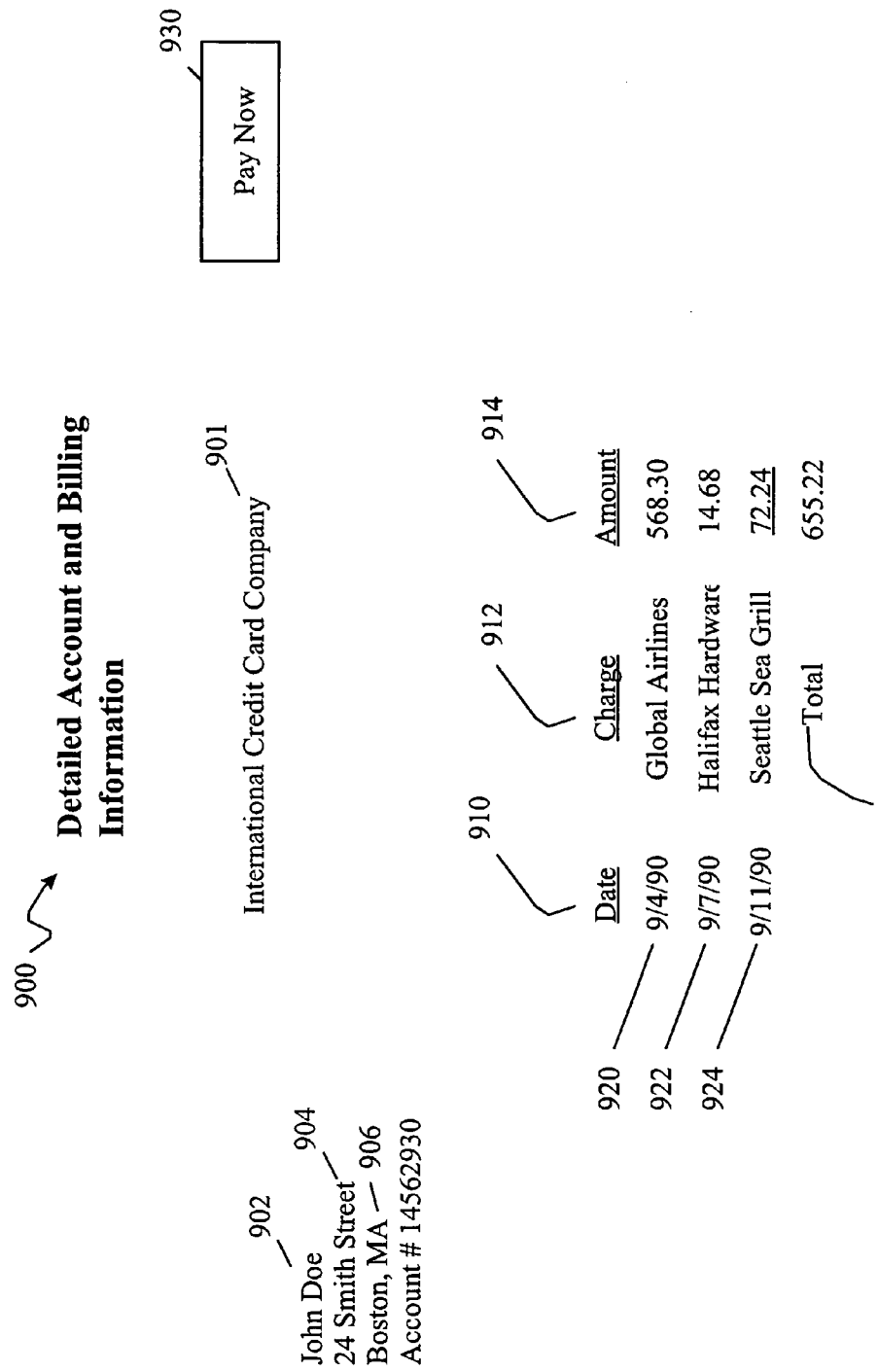
FIG. 9 depicts an illustrative example of a detailed account and billing information.

In one embodiment, the received and displayed account and billing information is summary billing information as described in FIG. 7, containing contact information to detailed account and billing information 900 also referred to as detailed contact information as described in FIG. 9. For this embodiment, the end user 126 can view the communicated summary account and billing information and optionally exercise the received detailed contact information to also view detailed information directly from a supplier of detailed account and billing information 130a-n.

The detailed contact information 900, added into the response by the distributor 102, provides a mechanism for the end user 126 to access more detailed information about a particular account from a particular account provider 20a-n directly from the account provider 20a-n or another supplier 130a-n of detailed billing information 900. The mechanism for direct access does not necessarily involve the distributor 102.

In one embodiment, the contact information includes an Internet Uniform Resource Locator (URL) address 1612. In this embodiment, a end user 126 while interfacing with the retail recipient 120 via an Internet browser program, can link to an Internet Web site of the supplier of detailed information 130a-n. This Internet Web site can present as Web pages, the detailed account and billing information associated with the end user's account established with the account provider.

In an alternative embodiment, the distributor 102 acts as an inventory supplier of account and billing information for recipients 120a-x to access. Account and billing information, preferably in large batch quantity, is transmitted to the distributor 102 by suppliers 130a-n according to a schedule or upon availability, as opposed to transmitted on demand. The distributor 102, can then inventory account and billing information, detailed account and billing contact information, and/or detailed account and billing information to respond to requests 112 for such information.

FIG. 7 is an illustrative block diagram depicting the retail recipient 120 receiving account and billing information on a scheduled, accommodation or on an availability basis and storing it into local storage 129. In this embodiment, the retail recipient facility 120 includes an inventory 129 of account and billing information. Upon an action from the end user 126, the recipient 120 accesses account and billing information from is own storage 129. In an alternate embodiment, an on demand request can be made as in FIG. 6 when the date and time associated with stored information 129 becomes sufficiently old or stale.

The distributor 102 receives account and billing information from each supplier 130a-n based on a particular information transfer policy. The distributor 102, contains an inventory of account and billing information 546d that stores such information received from each supplier 130a-n defined by the transfer policy with each transmitting supplier 130a-n. The distributor retrieves such information from inventory 546d to transmit to each recipient 120a-x in a manner defined by the transfer policy with each receiving recipient 120a-x. For illustration only, this figure depicts no on demand transfers as shown in FIG. 6. Although no shown, a distributor 102 can mix on-demand transfer with non on demand transfer among its suppliers and recipients, and between suppliers 130a-n and recipients 120a-x.

The frequency, timing and amount of information transferred between any two participants is a component of information transfer policy. The information transfer policy between the distributor and any one recipient 120a-x does not have to be the same as with any other recipient 120a-x or any other supplier 130a-n. The same applies between the distributor 102 and any supplier 130a-n. The information transfer policy can specify transfer of individual or large groups of account and billing information on demand, on a schedule or on availability.

To transfer information on demand between the supplier and distributor, the distributor 102 requests particular information from the supplier 130a-n and the supplier 130a-n responds with the requested information if it is available. This response can carry billing related information associated with one or a large number of account holders 10a-n and account providers. This method of delivery is also referred to as the distributor 102 "pulling" the information from the supplier 130a-n. When "pulling", the distributor 102 as a receiving entity initiates communication with the transmitting entity to effect the transfer of information.

To transfer information on availability between the supplier and the distributor, the distributor 102 establishes criteria with the supplier 130a-n describing information it expects to receive from the supplier 130a-n when it becomes available. The supplier 130a-n, upon availability of the criteria information described by established criteria, supplies it to the distributor 102. This method of delivery is also referred to as the supplier 130a-n "pushing" the information from the distributor 102. When "pushing", the supplier 130a-n as the transmitting entity initiates communication with the receiving entity to effect the transfer of information.

To transfer information on accommodation between the supplier and the distributor, the distributor 102 establishes criteria with the supplier 130a-n describing information it expects to receive from the supplier 130a-n when it becomes available. The supplier 130a-n, upon availability of the criteria information described by established criteria, verifies that the distributor can accommodate the reception of this information. If it can be accommodated, the supplier 130a-n then transmits it to the distributor 102. If it cannot be accommodated, the supplier delays transmission until the distributor can accommodate it.

To transfer information on a scheduled basis, the information can be either "pulled" by the distributor 102 from the "supplier" 130a-n or "pushed" by the supplier 130a-n to the distributor 102 at pre-determined dates and times or with some periodic frequency. The schedule is established between the distributor 102 and the supplier 130a-n before any transfer of information is performed.

Figure 8:
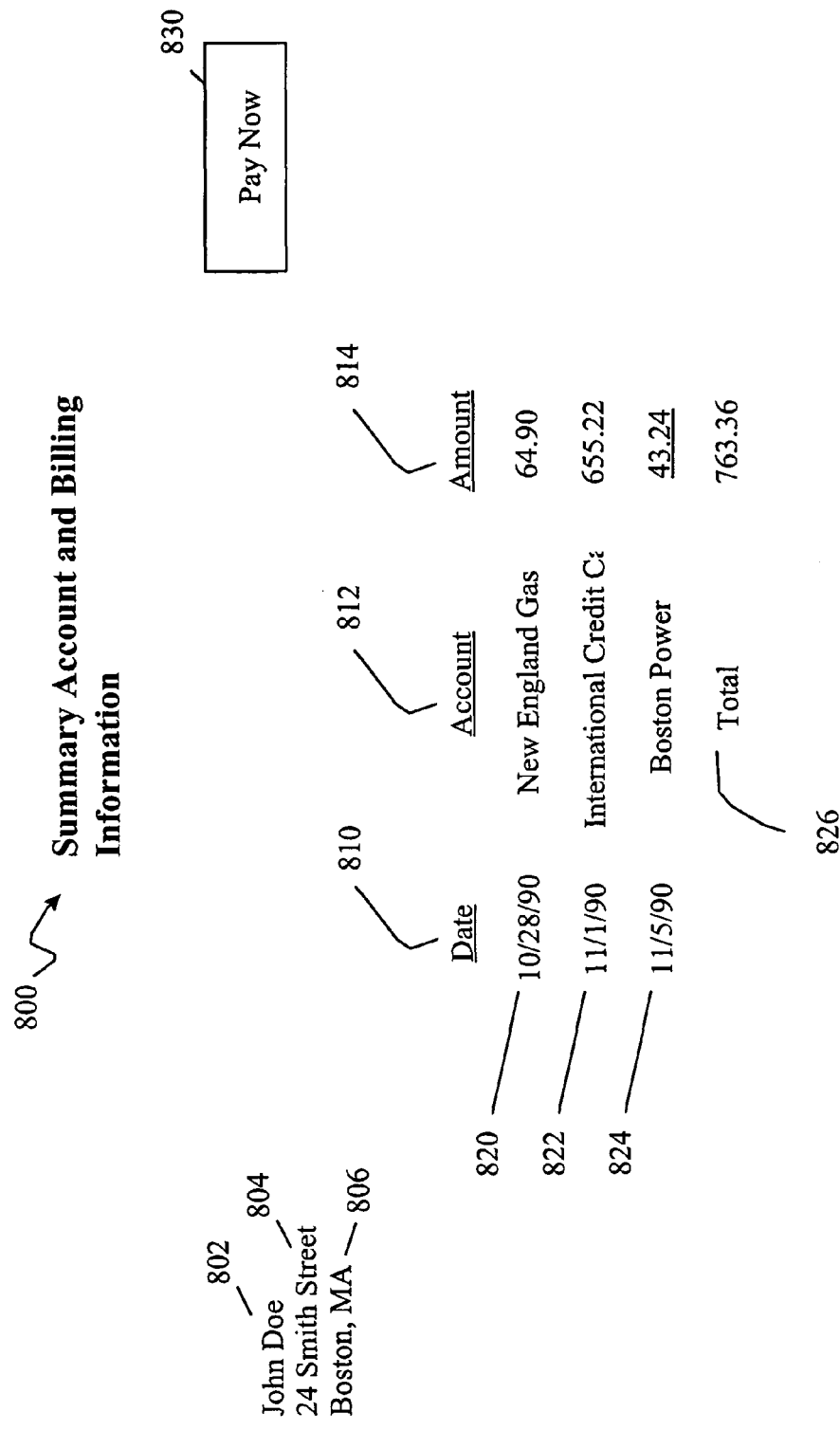
FIG. 8 depicts an illustrative example of a summary account and billing information.

FIG. 8 depicts an illustrative example of a summary account and billing information 800. This statement 800 identifies the account holder as "John Doe" 802 with an address of "24 Smith Street" 804 in "Boston, Mass." 806. Note that this identification information is not required if the this information was requested by an authenticated account holder 10a-n. The statement 800 contains three columns of information, namely "Date" 810, "Account" 812 and "Amount" 814.

The "Date" column 810, indicates the date that a particular account debt was incurred by the end user "John Doe" 802. The "Account" column 812, indicates the name of the account provider 20a-n or biller that the debt is owed to and the "Amount" column indicates the amount owed by the end user or customer "John Doe" 802 to the account provider 20a-n listed in the "Account" column.

For example, the line of summary billing information 820 indicates that the account holder 10a-n "John Doe" incurred a debt on "10/28/90" 820 to the account provider "New England Gas" in the amount of $"64.90". Likewise, the line of summary billing information 822 indicates that the account holder 10a-n "John Doe" incurred a debt on "11/1/90" 822 to the account provider 20a-n "International Credit Card" in the amount of $"665.22". The line of summary billing information 824 indicates that the account holder "John Doe" incurred a debt on "11/5/90" 824 to the account provider 20a-n "Boston Power" in the amount of $"43.24". The line of summary billing information 826 totals all debts incurred by "John Doe" over all billers to the amount of $"763.36".

The account holder 10a-n also has the option to pay a selected and line of summary billing information by selecting and activating the pay now button 830. This action initiates the payment process that transmits a digital payment transaction 1558 to a bill payment provider 1580. The bill payment provider 1580 is a business entity accessible over the network that can effect payment of the selected line of summary billing information.

Distributing summary billing information to account holders as end users enables the account provider 20a-n to maintain control of detailed account and billing information. This attracts end users of summary billing information back to the account provider 20a-n to enable the account provider to brand, advertise, sell and cross-sell to the end user traffic. The summary billing and account information format satisfies the needs of convenience sought by end users as bill payers.

FIG. 9 depicts an illustrative example of a detailed account and billing information 900. This statement 900 identifies the account holder 10a-n as "John Doe" 902 with an address of "24 Smith Street" 904 in "Boston, Mass." 906. The statement 900 contains three columns of information, namely "Date" 910, "Charge" 912 and "Amount" 914. The "Date" column 910, indicates the date that a particular account debt was incurred by the account holder 10a-n "John Doe" 902. The "Charge" column 912, indicates the name associated with a particular charge that is subtotaled and summed to determine the total debt owed to the account provider 20a-n and the "Amount" column indicates the amount of debt incurred by the charge associated with the account holder 10a-n "John Doe" 902 to the account provider 20a-n "International Credit Card Company" 901.

For example, the line of detailed billing information 920 indicates that the account holder "John Doe" incurred a credit card charge debt on "9/4/90" 920 to the account provider 20a-n "Global Airlines" in the amount of $"568.30". Likewise, the line of detailed billing information 922 indicates that the account holder 10a-n "John Doe" incurred a credit card charge debt on "9/7/90" 922 to the account provider 20a-n "Halifax Hardware" in the amount of $"14.68". The line of billing information 924 indicates that the billable entity "John Doe" incurred a credit card charge debt on "9/11/90" 924 to the account provider 20a-n "Seattle Sea Grill" in the amount of $"72.24". The line of detailed billing information 926 totals all credit card charge debts incurred by "John Doe" to the amount of $"655.22". This amount is owed to "International Credit Card" as listed in the line of summary billing information 822 intersecting with the summary amount column 814 of FIG. 8.

Summary billing information condenses or summarizes the detailed account and billing information originating from each biller and aggregates summarized billing information from all billers into one billing statement. The summary billing statement provides the total amount owed to each associated biller. Detailed billing contact information provides direct access to detailed billing information as presented by a source of detailed billing information which could be a an account provider 20a-h, distributor or other intermediary 25. This source is typically the account provider, but can be an intermediary including a distributor if configured as such Detailed billing information provides subtotals of amounts owed to a particular account provider 20a-n by the account holder 10a-n. Detailed billing information provides sub-total amounts owed to a account provider 20a-h that sum to the summary billing information total amount owed to each account provider 20a-h. Detailed account and billing information can also include associated attributes and explanations of account credits and debits.

Figure 10:
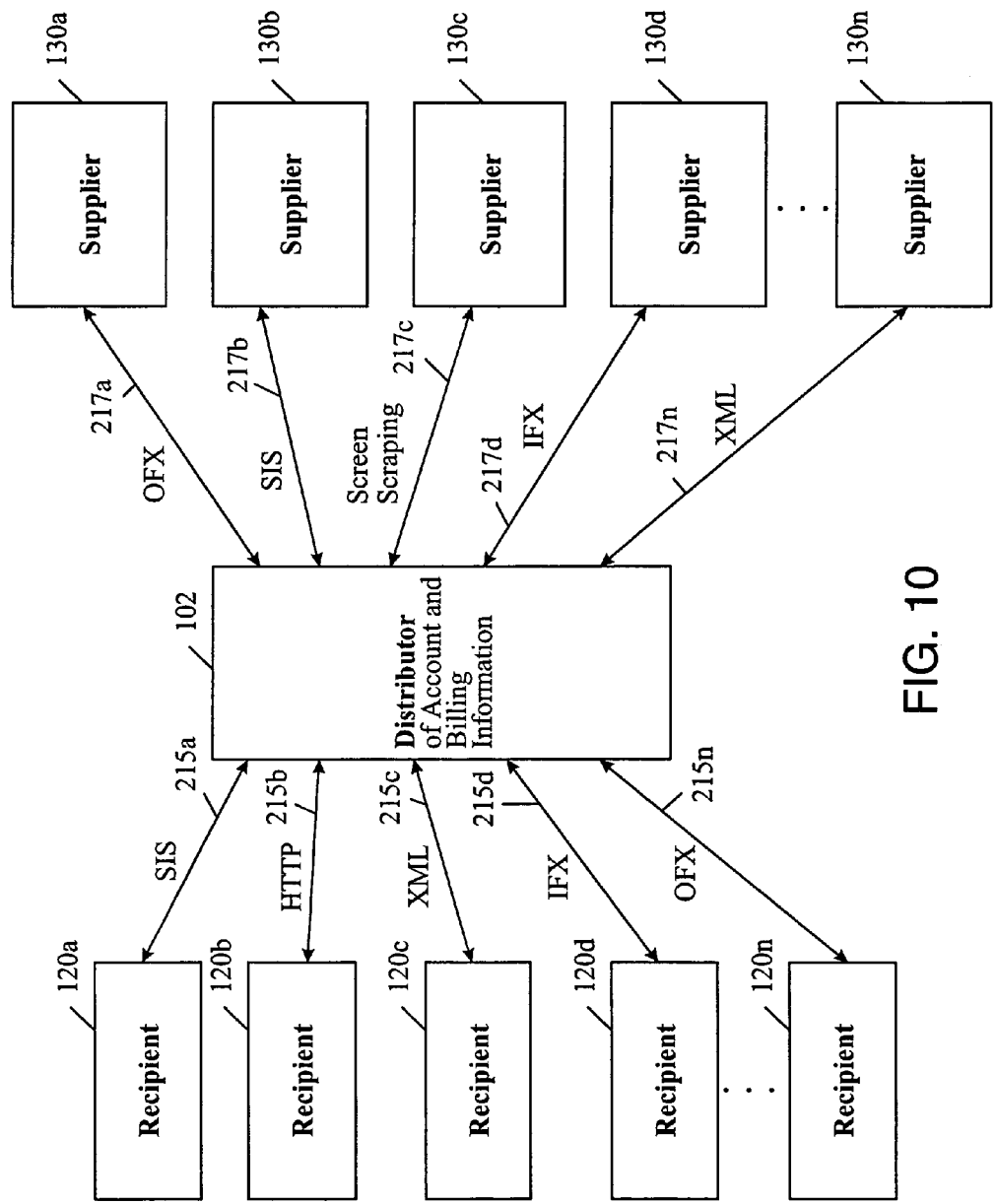
FIG. 10 is an illustrative block diagram depicting an embodiment of the distributor receiving account and billing information each from multiple suppliers in any one of a plurality of communications protocols and data formats and transmitting account and billing information to multiple recipients in any one of a plurality communications protocols and data formats.

FIG. 10 is an illustrative block diagram depicting an embodiment of the distributor 102 receiving account and billing information each from multiple suppliers 130a-n in any one of a plurality of communications protocols and data formats and transmitting account and billing information to multiple recipients 120a-n in any one of a plurality communications protocols and data formats. The distributor 102 receives account and billing information of communications channels 217a-n and transmits the account and billing information over communications channels 215a-n.

Each supplier 130a-n provides account and billing information via a particular communications protocol and a particular data format to the distributor 102. This protocol and data format combination can be one of many possible proprietary and open standard delivery arrangements. A supplier and recipient specify the required communications protocol and data format desired to be used to interface with the distributor 102 If the recipient is a billing consolidator, this consolidator specified format is typically a proprietary format unique to the particular consolidator.

In FIG. 10, the distributor 102 receives billing information from a supplier 130a in the OFX protocol and format. The distributor 102 also receives billing information from supplier 130b in the SIS protocol and format, from supplier 130c from screen scraping information from the supplier 130c Internet Web site, from the supplier 130d in the IFX protocol and format, and from supplier 130n in the XML protocol and format.

Screen scraping involves distributor 102 controlled software "crawling" through a Web site of a supplier 130a-n of account and billing information to extract information contained inside Web pages accessible from the Web. These pages can contain HTML, XML or any other means of encoding a graphic and or text interface. This technique enables the distributor to access account billing information from the Web site of a biller. The biller does not need to expend effort to transfer such information to the distributor. HTML scraping involves accessing the Web site of the biller and extracting billing information from the HTML content of the Web pages displayed over the interne. Access to this information typically requires submitting user authentication information to the billing site.

The distributor 102 supplies billing information to a recipient 120a in the SIS protocol and data format. The distributor 102 also supplies billing information to a recipient 120b in the HTTP protocol and data format, to a recipient 120n in the CSAPI protocol and data format, and to translate a retail recipient 120a in the IFX protocol and data format and to a retail recipient 120n in the OFX protocol and data format. Note that the distributor can connect any communications input to any output.

Note that the distributor can translate and re-transmit any input 217a-n to any output 215a-n. Software that performs communication protocol and data format translation functionality is packaged into software units referred to as cartridges. Cartridges can be added to and configured inside the Account and Billing Information Communication Protocol software 560 executing inside the distributor 102. Within the distributor, a separate cartridge can operate to communicate with another participant via a particular communications protocol over a separate communications channel or connection. Furthermore, each cartridge can be separately provided to a participant, such as a supplier 130a-n or receiver to support a particular communications protocol and data format interface with the distributor 102.

In one embodiment, the distributor 102 software 560 can be provided to suppliers 130a-x or recipients to enable them to transmit or receive billing information in a selected one of many predetermined communication protocols and data formats to the distributor 102 or to other intermediaries 25 such as billing portals, banks or consolidators or recipients 120a-n. The distributor 102 also includes software 560 to enable it to receive billing information in a selected one of many predetermined protocols and data formats.

The generator 630 can also provide software 652 to suppliers 130a-n that converts raw billing information 650 into detailed billing information 654. Providing flexibility for both transmitting and receiving billing information, the distributor 102 and generator 630 enable each supplier of account and billing information 130a-n to supply the distributor 102 in selected one of many pre-determined protocols and data formats regardless of the protocol and data format each required by the one or more recipients 120a-n down stream of the distributor 102.

Furthermore, each supplier 130a-n can supply many participants through a distributor 102 with only one transmission of account and billing information in one communication protocol and one data format, as opposed to supplying with multiple transmissions of the same account and billing information where each transmission is made in a particular communications protocol and data format as required by each receiving recipient 120a-n.

FIG. 11 is an illustrative block diagram depicting an embodiment of internal hardware and software components and the distributor 102. All participants including account providers 20a-n, suppliers 130a-n, recipients 120a-x and end users 126 associated with the information processed by the distributor 102 must directly or indirectly register with the distributor 102. An account holder 10a-n or other type of end user 126 can register with the distributor 102 at a retailer, retail recipient facility 120, at an account provider 20a-n or supplier 130a-n facility or directly with the distributor 102. The end user 126 need only register once at one participant location to be serviced by all participant entities within the scope of processing activity of the distributor 102. The distributor 102 records information associated with each registered participant 546a into participant profile records. Participants include account providers 20a-n or billers, suppliers 130a-n, recipients and end users.

Illustratively, the distributor 102 includes at least one host computer 504 that executes Distributor Operating Software 540 that includes but is not limited to operating system software functionality such as provided by the SUN Solaris or Windows NT operating systems. This component 540 can include operating system like functionality that performs fundamental distributor functions shared and utilized by other distributor software components. All software accessing this component 540 is able to communicate with all other accessing software via inter-process communication functionality such as shared memory, secure socket communication, remote procedure calls and the like. This component 540 can and should include distributor functionality that is best shared among other distributor software components and should have access to a communications channel 550 via communications interface software 548. The communications interface software can reside as part of the operating system inside the operating software component 540.

The Operating Software Component 540 has access to the enrollment data of registered participants 546a, participant relationship information 546b, audit tracking and reporting information 546c and account and billing information 546d. Other software components, such as the JavaScript Interface 566, Participant Registration 564, Internet Web Site 562, Other software 544 and Account and Billing Information Communication Protocol component 560, access all distributor data 564a-d and operating functionality 540 and communications functionality 548 through the distributor operating software 540 and its applications programming interface (API) 540a.

The host computer 504 can also execute Other software 544 that exercises the applications programming interface 540a provided by the distributor operating software 540. All software components, including the Other software 544 may optionally reside on a remote computer in communication with the host computer 504. Such an arrangement can utilize remote procedure call functionality provided by many operating systems. The Other software component 544 enables the behavior of the distributor 102 to be programmable by the operator or purchaser of the distributor 102. All other components such as the JavaScript Interface 566, Participant Registration 564, and Internet Web Site 562 can exercise this interface 540a.

The operator would likely be a purchaser of the distributor 102 and operate it as part of a business enterprise. Programmability enables the operator to customize the exact behavior of the distributor 102 to address particular operating circumstances. The distributor can be packaged, manufactured and purchased as software installed on computer readable media. The purchaser would install the distributor software onto host computer hardware either pre-owned or purchased for this purpose. For example, an distributor 102 might want customize a registration policy or a user interface to all participants end users within the scope of its operation. This user interface could have a look and feel that conveys branding of the services provided by one or more intermediaries 25.

Figure 12:
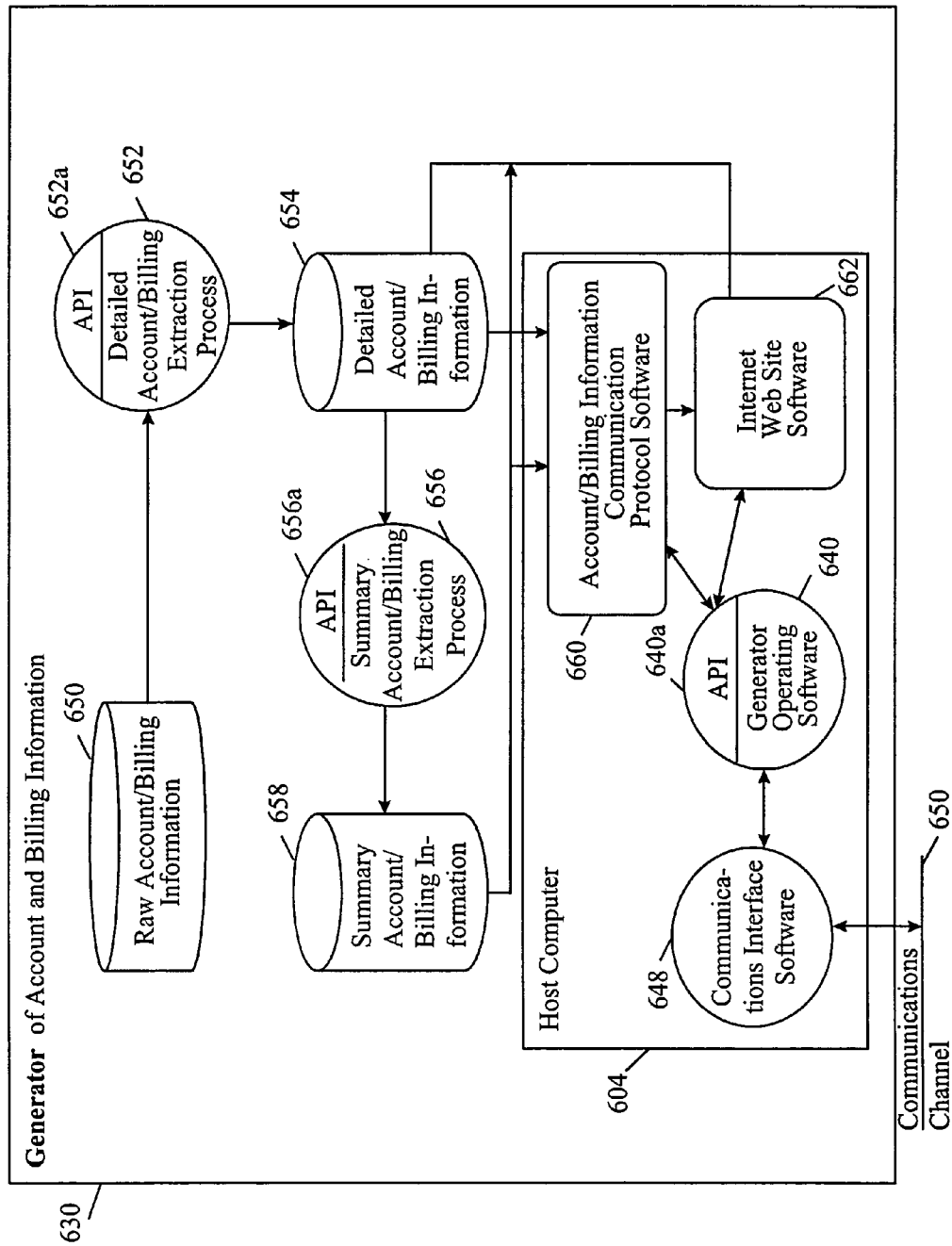
FIG. 12 is an illustrative block diagram depicting the internal hardware and software components of a Generator of Account And Billing Information apparatus and system.

FIG. 12 is an illustrative block diagram depicting the internal hardware and software components of a Generator of Account And Billing Information 630 apparatus and system. The account provider 20a-n is in possession of account and billing information in some original form, referred to as raw billing information 650. This form can be on printed paper and electronically scanned into electronic storage in a particular format. Detailed billing information 654 is extracted via the detailed billing information extraction process 652. Summary account and billing information 658, can be further extracted from the detailed account and billing information 654, via the summary billing information extraction process 656. Both extraction processes 652 and 656 are software components with APIs 652a and 656a, to enable customization of how data is processed between particular input and output data formats.

The Generator of Account And Billing Information 630 contains a host computer 604, which executes Communications Interface Software 648, Account And Billing Information Communication Protocol Software 660 and Internet Web Site Software 662. The host computer 604, is physically connected to a communications channel 650. Although not shown, both extraction processes 652 and 658 can execute on the host computer 604 and can access Generator Operating Software functionality 640 through its API interface 640a. Also, all processed data 650, 654 and 658 is accessible from the Generator Operating Software 640 and from all software that can access Generator Operating Software functionality 640.

An account provider 20a-n as a or supplier 130a-n, or a non-account provider supplier, can purchase and equip itself with a Generator of Account And Billing Information 630 system to enable it to participate with one or more distributors 102. As shown in FIG. 6, a distributor 102 can communicate a request 114a for billing information over the communications channel 650 to the supplier 130a. The supplier 130a, via the system 630, processes this request via the communications interface software 648 and the billing information communications protocol software 660. The account and billing information protocol software 660 in response to the request 114a, transmits a response 116a including the requested account and billing information. This response can optionally include various types of account and billing information such as summary billing information, or detailed account and billing contact information or the actual content of detailed account and billing information 654 itself.

The Internet Web site software 662, creates an Internet accessible Web site accessible to any participants with permitted access including account holders 10a-n as end users 126. This site can present any type of account and billing information associated with the account holder 10a-n through the Web site software 662. This billing information can be organized into Web pages. For example, the Web site software can present summary and detailed billing information associated with an account holder 126, in a secure fashion, only to end users 126 permitted to access the account. This billing information could be organized into Web pages. An end user identification and authentication mechanism can be implemented inside the Internet Web site software 562 to limit access to billing information associated with an account holder 126 only to end users 126 permitted to access that account.

Figure 13:
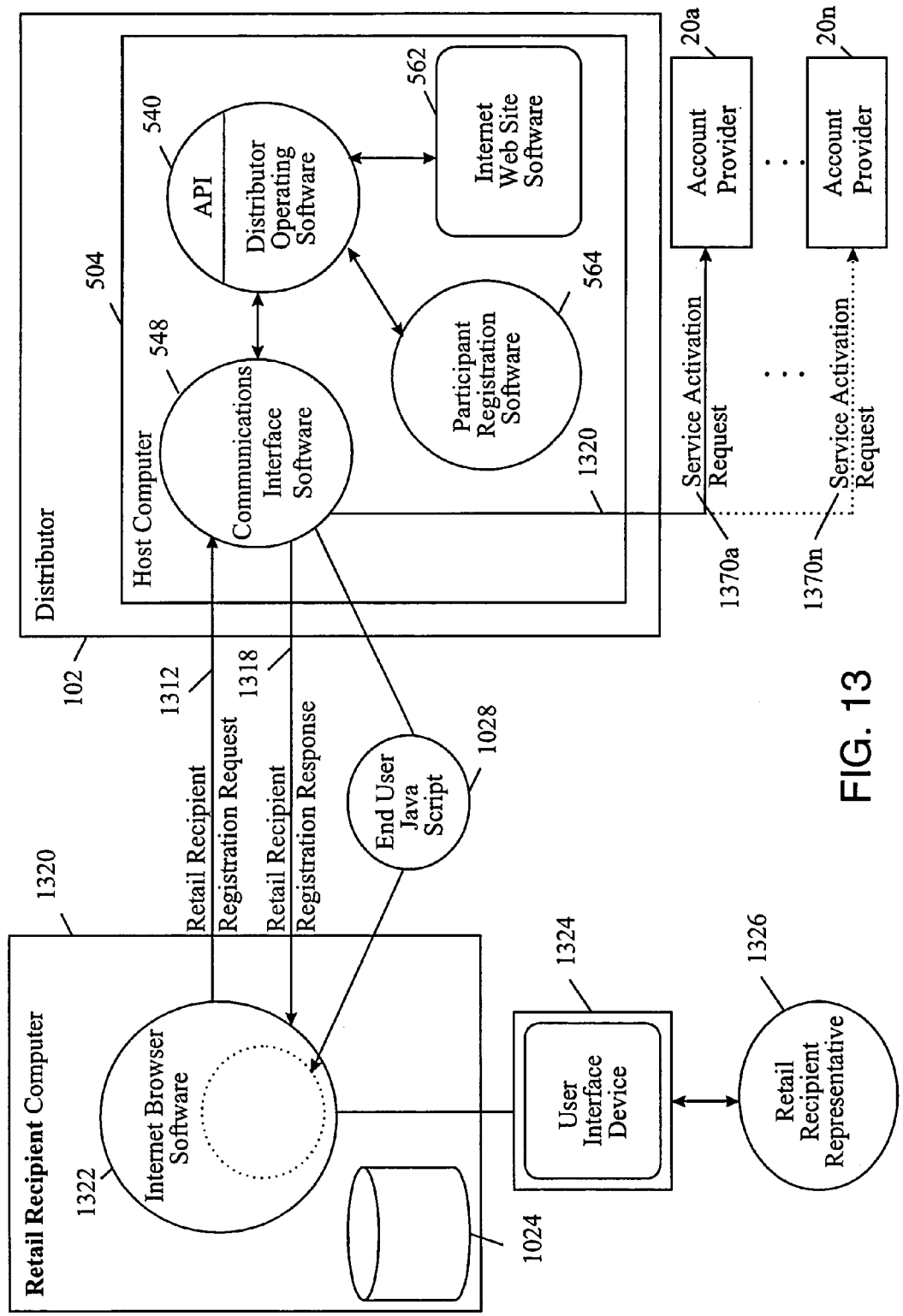
FIG. 13 depicts an illustrative embodiment of retail recipient registering as a participant with the distributor.

FIG. 13 depicts an illustrative embodiment of retail recipient 120a-n registering as a participant with the distributor 102. A retail recipient representative 1326, a person with authority to register the retail recipient 120 as a participant, supplies information required by the distributor 102 as discussed in FIG. 5. Information provided by the representative 1326 in the form of a retail recipient registration request 1312 is transmitted from the retail recipient computer 1320 via an Internet browser 1322 to the distributor. This information could include billing information delivery requirements, requested information transfer policy, a list of requested account providers that originate account and billing information, retail recipient 120 network address, telephone, representative names, contact information, etc. In this embodiment, this registration request includes a request for the distributor 102 to supply end user interface software 1028 to the retail recipient 120. In this illustrative embodiment, the distributor 102 provided software would be implemented in the form of JavaScript 1028.

he distributor 102 transmits a retail recipient registration response 1318 back to the retail recipient representative 1326 through the internet browser 1322. If this response acknowledges registration, then the distributor 102 would also transmit the distributor provided end user interface software implemented as JavaScript 1028 and instructions to the retail recipient 120 personnel for its use.

In one embodiment, the JavaScript is displayed on the browser 1322 to enable cut and paste into another location capable of storing and executing the JavaScript. The instructions would instruct the retail recipient 120 personnel to choose a location within its end user interface, such as an Internet Web page provided by the retail recipient 120a-n, to place the billing information registration, presentment and payment functionality. This location would be accessible by prospective end users 126 associated with the retail recipient 120.

A visual user interface component, such as push button icon labeled as account and billing information functionality, chosen by the retail recipient 120 personnel, could be located on a chosen retail recipient Web page for the purposes of providing JavaScript access to an end user 126. The retail recipient 120 personnel would then store an association of the distributor 102 supplied JavaScript 1028 to the user interface component, or push button icon, so that the JavaScript 1028 is executed upon selection, (click of a mouse pointer) on the component (push button) by the end user 126.

When executing, the JavaScript 1028 performs all actions required for the distributor 102 to register, log on and authenticate, service and supply the end user 126 with account and billing information.

Successful registration also causes the distributor 102 to generate one or more service activation requests 1370a-n to all selected and associated account providers 20a-n. For example, if the retail recipient choose two utility companies to supply account and billing information, then those companies would receive service activation requests 1370a-n. If those companies agree to supply the newly registered retail recipient 120 facility, both companies would respond by acknowledging permission for the retail recipient to receive account and billing information by each company. Both company would take action to supply the distributor with the account and billing information. The participant registration 546a and participant relationship and security 546b databases would receive and store this information.

Figure 14:
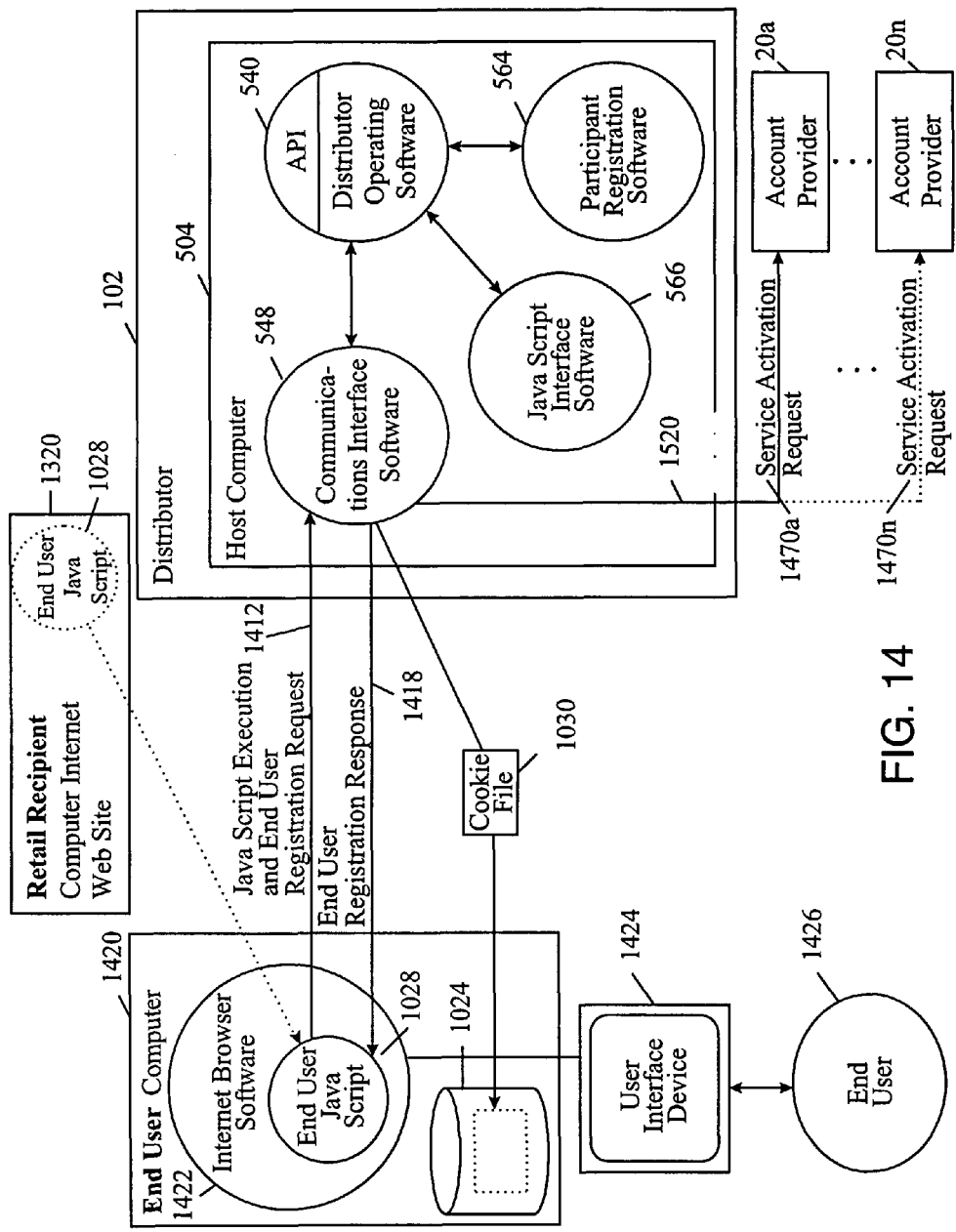
FIG. 14 depicts an illustrative embodiment of the end user executing the retail recipient facility Web site supplied JavaScript.

FIG. 14 depicts an illustrative embodiment of the end user executing the retail recipient facility 1320 Web site supplied JavaScript. The end user executes the retail recipient facility supplied JavaScript to by selecting or double clicking a mouse pointer on the visual user interface object containing JavaScript which resides on a retail recipient 120 provided Web page 1320. When the end user 126, selects this object, by pointing and clicking the mouse pointer on the object, the distributor 102 supplied JavaScript 1028 is processed by the browser 1422. The JavaScript 1028 establishes a network communications connection and interfaces with of the JavaScript interface software 566 remotely resident and executing at the distributor 102.

The remote JavaScript interface software 566, executing in the distributor's host computer 504, then performs the following procedure. The JavaScript interface 566 first searches the end user's computer 1420 and its local storage 1424 for a data file identified as a "cookie file" 1030. This file 1030 identifies and describes the end user or browser user as a prior registrant of the distributor's 102. Because this is the end user's first execution of the JavaScript, the end user 1426 has not registered with the distributor 102. If the browser user has already executed the JavaScript and registered with the billing distributor 102, then the "cookie file" 1030 would have already been stored on the browser user's computer's local storage 1024 by the distributor 102 after prior successful registration with the distributor 102.

If the cookie file 1030 is not found, the JavaScript interface software 566 offers either to register or to log on and establish a session with the end user 126. The log on procedure authenticates the end user 1426. An unregistered end user 1426 has no user identifier and is unable to be authenticated and cannot log on to the distributor 102 at this time. Because this is the end user's first execution of the JavaScript, he elects to register. The JavaScript interface software 566 initiates registration of the end user by displaying an end user registration screen via the JavaScript 1028 while executing in the browser program 1422.

Upon registering, the distributor 102 will transmit a cookie file 1030 to the end user computer local storage 1024 and transmit a response containing account and billing information to enable the end user 126. In this embodiment, summary account and billing information which detailed account and billing contact information is transmitted and displayed to the end user 1424 as shown in FIG. 8. This embodiment enables the end user to access summary billing information directly from the distributor 102. This feature ensures that the end user can be register directly with the distributor during a session established with the distributor 102 via the JavaScript end user interface software 1028.

If the end user 126 has previously registered from this computer 1420, then a cookie file 1030 would have been stored in local storage 1024. If the JavaScript interface 566 finds a valid cookie file 1030 stored on the end user's computer 1420, it then asks for authentication information such as end user identification and a secret password to log on and establish a session between the end user and the distributor 102. After logon, it then searches for account and billing information associated with the end user 126 from within its records 546d. Execution of the JavaScript 1028 in this circumstance establishes a session with the JavaScript interface 566. In this embodiment, the distributor 102 automatically transmits a response containing summary account and billing information associated with the end user 126 who is identified by information contained in the cookie file 1030. In an Alternative embodiment, an end user command interface is provided to the user to execute functionality on demand. In this embodiment, the end user's browser 1022 then displays the end user's summary account and billing information available for access by the end user via the browser 1022.

If no cookie file 1030 was found, but the end user 126 has already registered with the distributor 102 and the distributor 102 has record of the previous registration 546a, then the end user 126 can elect to log onto the system for access to account and billing information. Upon logging onto the system, the JavaScript interface software 566 then verifies from its records 546a that the end user 126 has pre-registered and then downloads a cookie file 1030 onto the end user's local storage 1024. The end user is then provided access to account and billing information.

This distributor 102 provided end user interface software 1028 enables a retail recipient facility 120a-n to provide bill presentment and payment functionality to each of its end users with almost no effort and no software to be traditionally installed, supplied or developed by the retail recipient 120. The information content of the JavaScript 1028 is independent of any attribute of the retail recipient 120 facility except for the requirement that network communication functionality between the retail recipient 120 and the distributor 102 be working properly. No other changes beyond choosing a location for the JavaScript inside a Web page is required of the retail recipient 120. Furthermore, a distributor 102 can provides the same convenience directly to an end user without the end user having to interface with any retail recipient 120.

The retail recipient 120 must simply decide where in the portal's Web site the single line of JavaScript 1028 will reside and how the user will cause it to be executed. Once executed, the JavaScript 1028 calls upon the distributor's host machine 304 and the JavaScript interface software 566 to carry out all the remaining actions necessary to provide the retail recipient end user with bill presentment and payment functionality.

Figure 15:
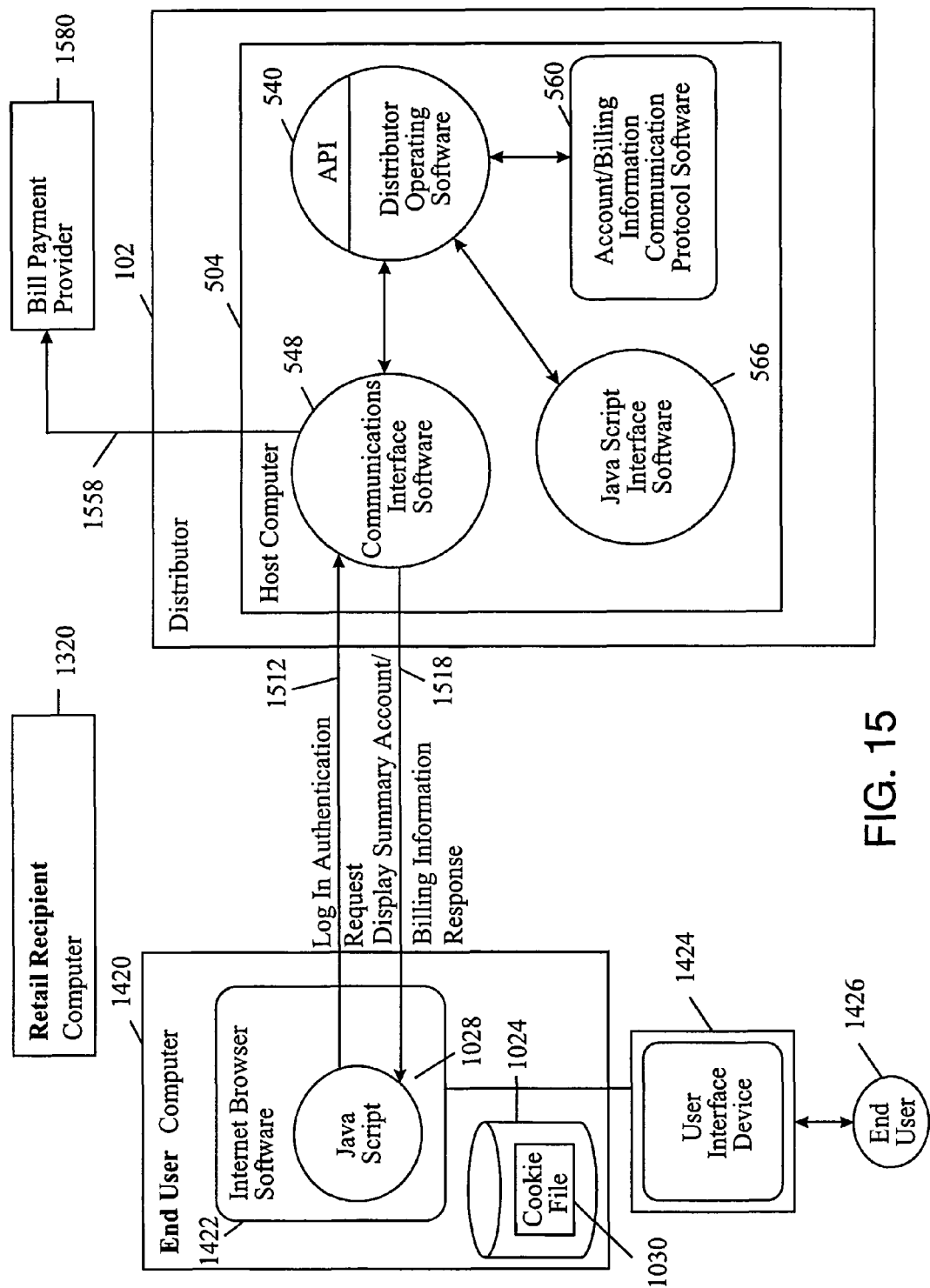
FIG. 15 depicts an illustrative embodiment of a pre-registered end user executing and interfacing with the distributor supplied JavaScript to log on to and establish a session with the distributor and to retrieve account and billing information.

FIG. 15 depicts an illustrative embodiment of a pre-registered end user 126 executing and interfacing with the distributor 102 supplied JavaScript 1028 to log on to and establish a session with the distributor 102 and to retrieve account and billing information. Log on to the distributor 102 authenticates the user. The JavaScript end user interface software 1028 then provides all current account and billing information to the end user 126.

In the illustrated embodiment, the JavaScript interface 566 transmits summary account and billing information 1518 with embedded detailed account and billing contact information to the end user 1426. Account and billing communication protocol software 560, executing on the distributor's host computer 504, retrieves the requested account and billing information for the JavaScript interface software 566 to transmit a response 1518 containing the requested billing information to the end user 1426 through the browser 1422.

In this embodiment, the response 1518 contains summary billing information 1100 and embedded detailed account billing contact information. Detailed billing contact information, addressing a supplier of detailed billing information 900, can be associated with each line of summary billing information 800. The JavaScript 1028 can present the summary billing information 800 to the end user 1426 in a Web page like format. The end user 1426, can have the option to select a line of summary billing information to access detailed billing information 900 associated with the selected line of summary billing information.

The end user also has the option to pay a selected and line of summary billing information by selecting and activating the pay now button 830. This action initiates the payment process that eventually transmits a digital payment transaction 1558 to a bill payment provider 1540. The bill payment provider 1540 is a business entity accessible over the network to effect payment of the selected line of summary billing information.

Figure 16:
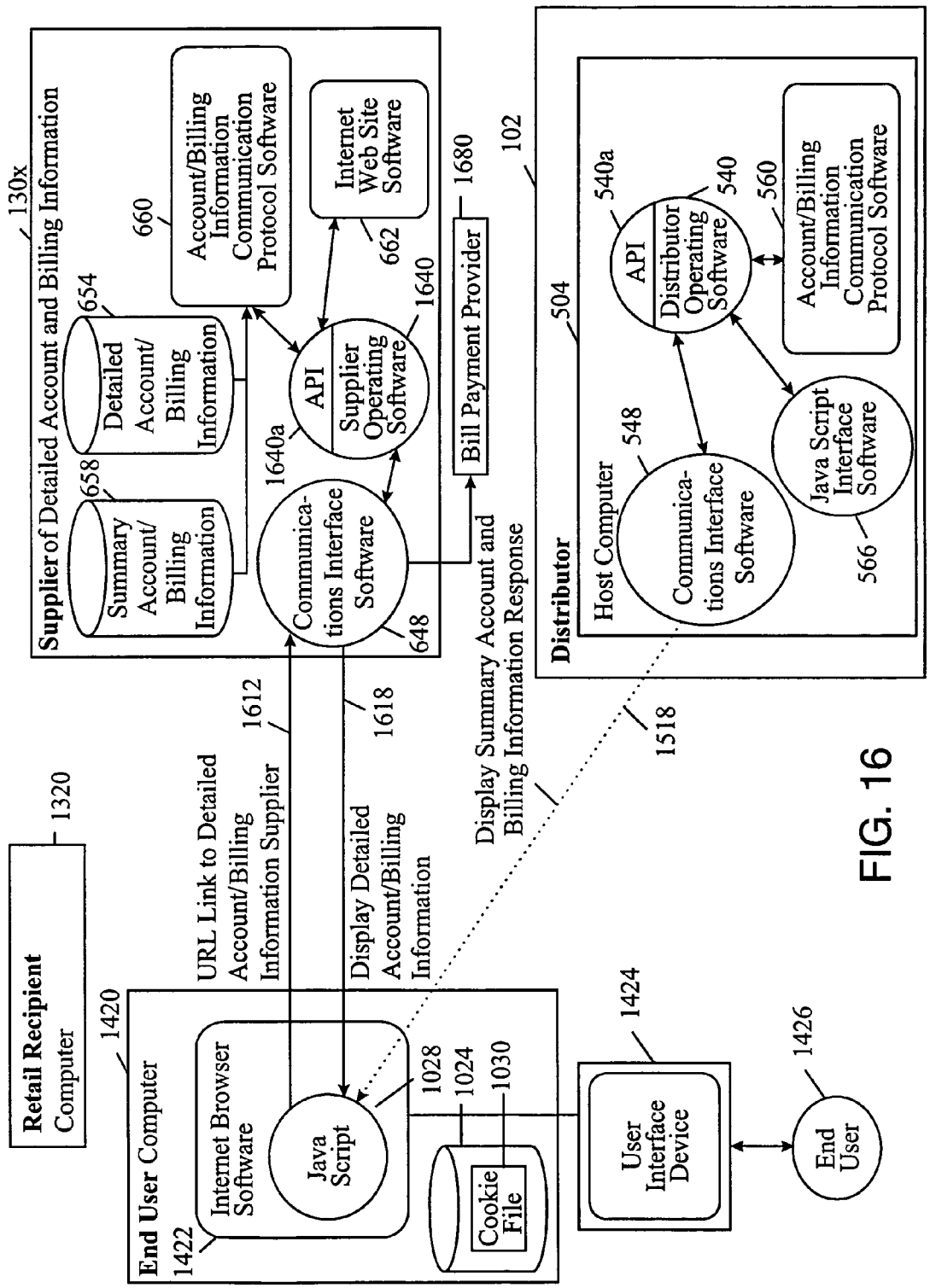
FIG. 16 depicts an illustrative embodiment of a end user utilizing the detailed account and billing contact information associated with the displayed summary account and billing information to access detailed account and billing information directly from its supplier.

FIG. 16 depicts an illustrative embodiment of a end user 1426 utilizing the detailed account and billing contact information 1612 associated with the displayed summary account and billing information to access detailed account and billing information directly from its supplier 130x.

In this illustrative embodiment, detailed billing contact information 1612 is an Internet URL link which addresses or directs access to another Internet Web site Selecting a line of summary billing information displayed by the JavaScript user interface, such as by double clicking on the summary billing information line, exercises the URL link 1612 to the supplier of detailed billing information 130 associated with the selected line of summary and account billing information. Consequently, detailed account and billing information is displayed as shown in FIG. 9. The end user also has the option to pay a selected and line of summary billing information by selecting and activating the pay now button 830. This action initiates the payment process that eventually transmits a digital payment transaction to a bill payment provider 1680. The bill payment provider 1680 is a business entity accessible over the network to effect payment of the selected line of summary billing information.

This JavaScript design can be provided by the distributor 102 such that a end user can register and access electronic bill payment functionality from a account provider or billed 20a-n Web site or from the distributor's 102 Web site in addition to Web sites of other retail recipients 120.

An advantage of the JavaScript approach is that it provides one streamlined and uniform user interface design to the end user 126 regardless of which associated retail recipient 120 the end user chooses to access billing information from. From the end user 126 perspective, the only difference between retail recipients 120 involves where in the retail recipient 120 user interface, namely on what retail recipient 120 Web page, and in what manner, the end user executes the JavaScript.

An end user does not have to learn a different user interface to register or access billing information between two different but distributor 102 associated retail recipients 120. This approach greatly simplifies and streamlines the functionality provided by the distributor 102, and reduces the cost to deliver billing information over a wide geographical area.

The simplicity of this approach motivates the creation of many points of access for the end user 126 to choose at a relatively low cost to the retail recipient 120. This encourages many retail recipients 120 to register and provide billing information within the scope of operation of an distributor 102 that provides such functionality in such a simple and inexpensive manner.

Upon initially registering or updating the registration of an end user 126, the distributor 102 provided JavaScript 1028 executes inside the end user's browser 1022 and lists billers that are available to provide billing information to the end user. Upon selecting each biller, the JavaScript asks the end user specific questions to gather information required by the selected biller in addition to unanswered questions that may be required by other participants. Such additional questions are unique to each biller and typically ask for information to be stored inside data fields residing inside a unique database record provided by the biller.

Figure 17:
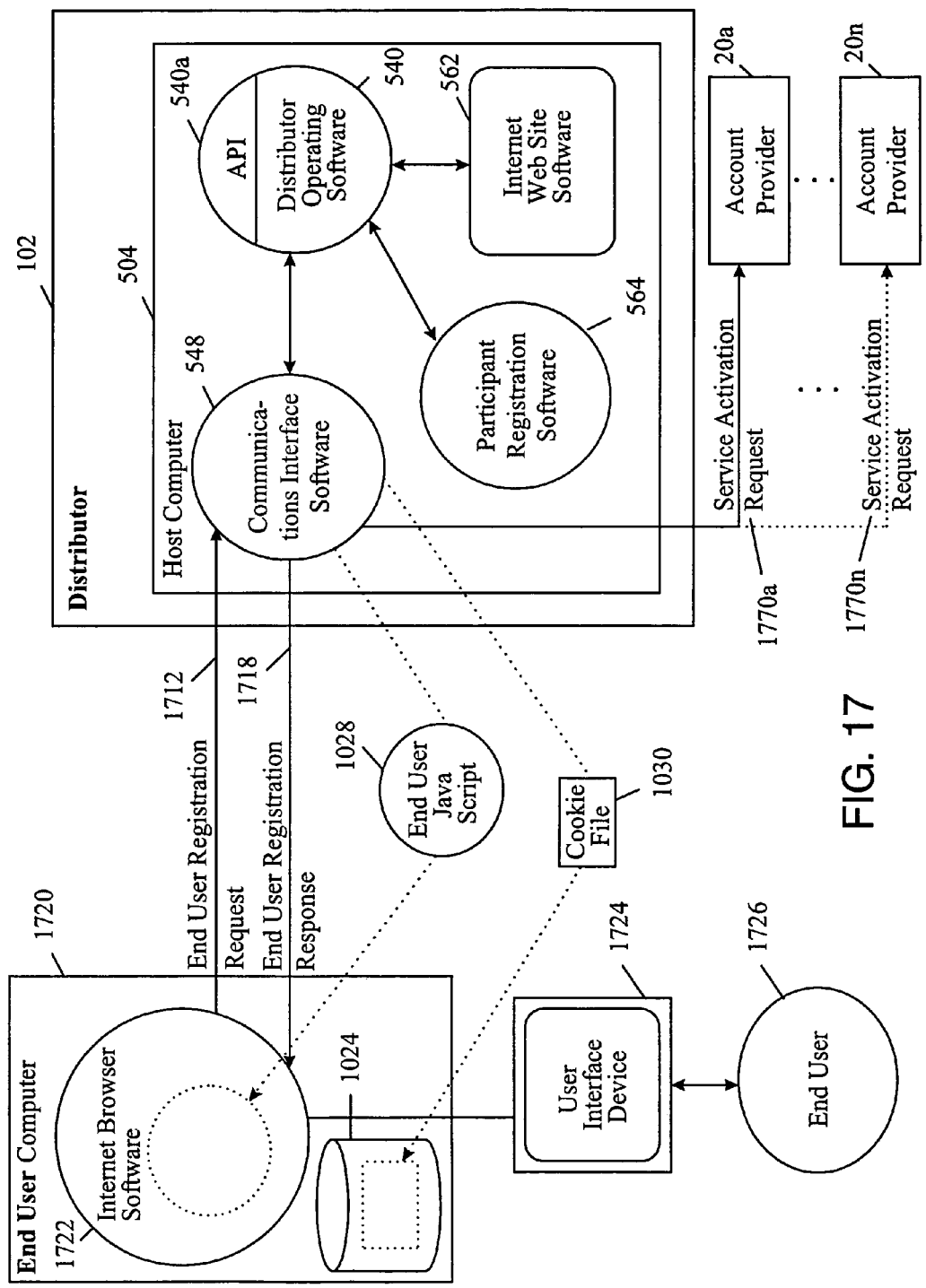
FIG. 17 depicts an illustrative embodiment of the end user directly registering as an end user participant with the distributor.

FIG. 17 depicts an illustrative embodiment of another end user, 1726 directly registering as an end user participant with the distributor 102. The end user 1726 accesses an Internet Web site like what is shown in FIG. 13 and supplies information required by the distributor 102 in the form of an end user registration request 1712 transmitted through an Internet browser software 1722. This information could include end user identification, network address, telephone, contact information, etc. The distributor 102 transmits an end user registration response 1718 back to the end user through the internet browser software 1722. If this response acknowledges successful registration, then the distributor 102 would also transmit a cookie file 1030 and instructions to the end user to access JavaScript from a distributor provided Web page.

A visual user interface component, such as an icon labeled as billing information functionality, could be provided to the end user to be, to be located in JavaScript enabling medium, such as a user chosen Web page.

Figure 18:
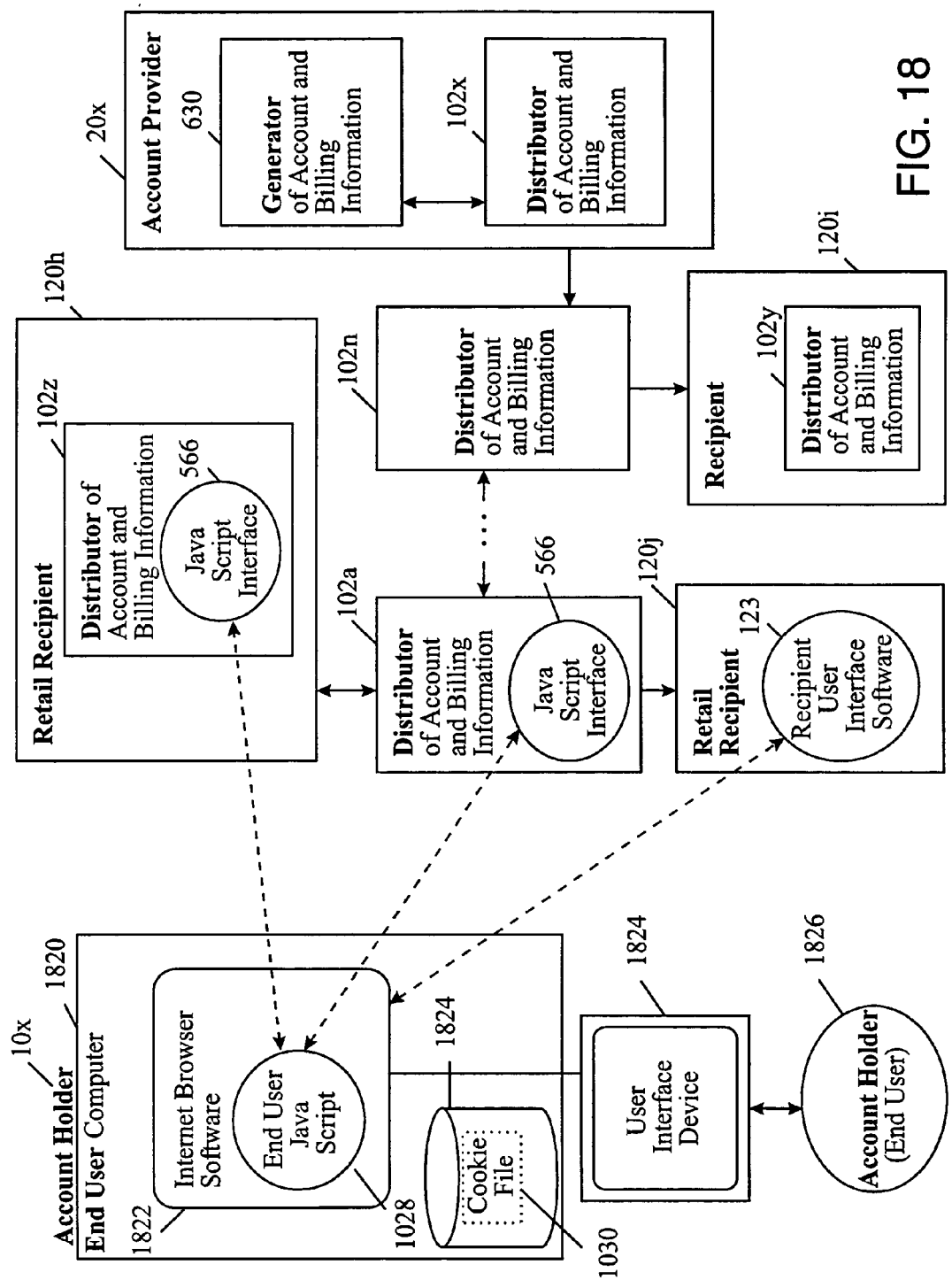
FIG. 18 depicts an illustrative embodiment of the invention linking account providers with account holders.

FIG. 18 depicts an illustrative embodiment of the invention linking account providers 20a-n with account holders 10a-n. The generator 630 generates account and billing information that is transferred by the distributor 102x to the distributor 102n, which also transfers information indirectly to the distributor 102a and directly the recipient 120i equipped with a distributor 102y. Retail recipient 120h, equipped with a distributor 102z interfaces with an account holder 10x acting as an end user 1826 through a computer 1820. The retail recipient 120h provides JavaScript end user interface software 1028, executed inside the end user browser 1822 to enable the end user to interact with the JavaScript interface 566 executing on distributor 102a.

Alternatively, the end user browser can interface with the retail recipient 120j that provides an end user interface other than distributor provided JavaScript end user interface software 1028.

The system and method of the invention provides greater user choice, operational scale and flexibility for providing account and billing information transfer, presentment and payment functionality.

The JavaScript implemented user interface software 1028 flexibly articulates to the end user the need for information required by a variety of billers consistent with unique database records supplied by each biller. The user interface queries the end user based on the structure and content of each biller provided record. A database record constitutes a row of a database table. The user interface utilizes vertical table functionality to characterize each unique record provided by an end user selected biller.

A vertical table is a special type of database table used to describe the structure of at least one other (regular) database table. The structure of any database table is defined by the definition of its rows and columns. Typically, a row represents an entity, such as a 'city", and each column associated with a row represents an attribute associated with that row entity, such as its "population" or "size". The number of table rows indicate the number of entities ("cities") described by the table. The number of columns of a table indicate the number of attributes ("population" and "size") used to describe each entity in the table. Every row in a database table is described by the same set of columns.

User interfaces display the contents of database tables typically on a per row (entity) basis. The attributes (column values) associated with each row (entity) are displayed in their entirety onto a display screen. The type and amount of attribute information associated with an entity effects how such information is physically arranged onto the user interface display screen. Changes to the structure of a database table, such as the type and or amount of attribute information contained within the table to be displayed, changes how such information is physically arranged onto the user interface display screen by the user interface software.

Vertical tables enable the user interface software, or any other software depending on the structure of a particular regular database table, to dynamically adjust to changes in the structure of such a regular database table. Each row in the vertical table is a column entity of a regular database table. Each row describes one column in the represented regular database table. Each column of the vertical table describes an attribute of a column in a regular database table. For example, if a regular database table has 8 columns, the associated vertical table will have at least 8 rows, each vertical table row intersecting with a vertical table column that describes an attribute of the associated regular table column.

Column attributes of a regular database table that are stored in the vertical table as columns include, (regular database) table identifier, column name, column (data) type and column length. This information enables table dependent software to first determine the number and types of columns associated with a particular regular database table or record (row), before determining the physical arrangement of such information on the user's display screen. Once this physical arrangement is determined, the contents of the vertical table described regular database table are displayed accordingly. In essence, a vertical table enables table dependent software, such as the JavaScript user interface software 1028, to dynamically adjust to structural changes made in other regular database tables that it processes and depends upon.

Figure 19B:
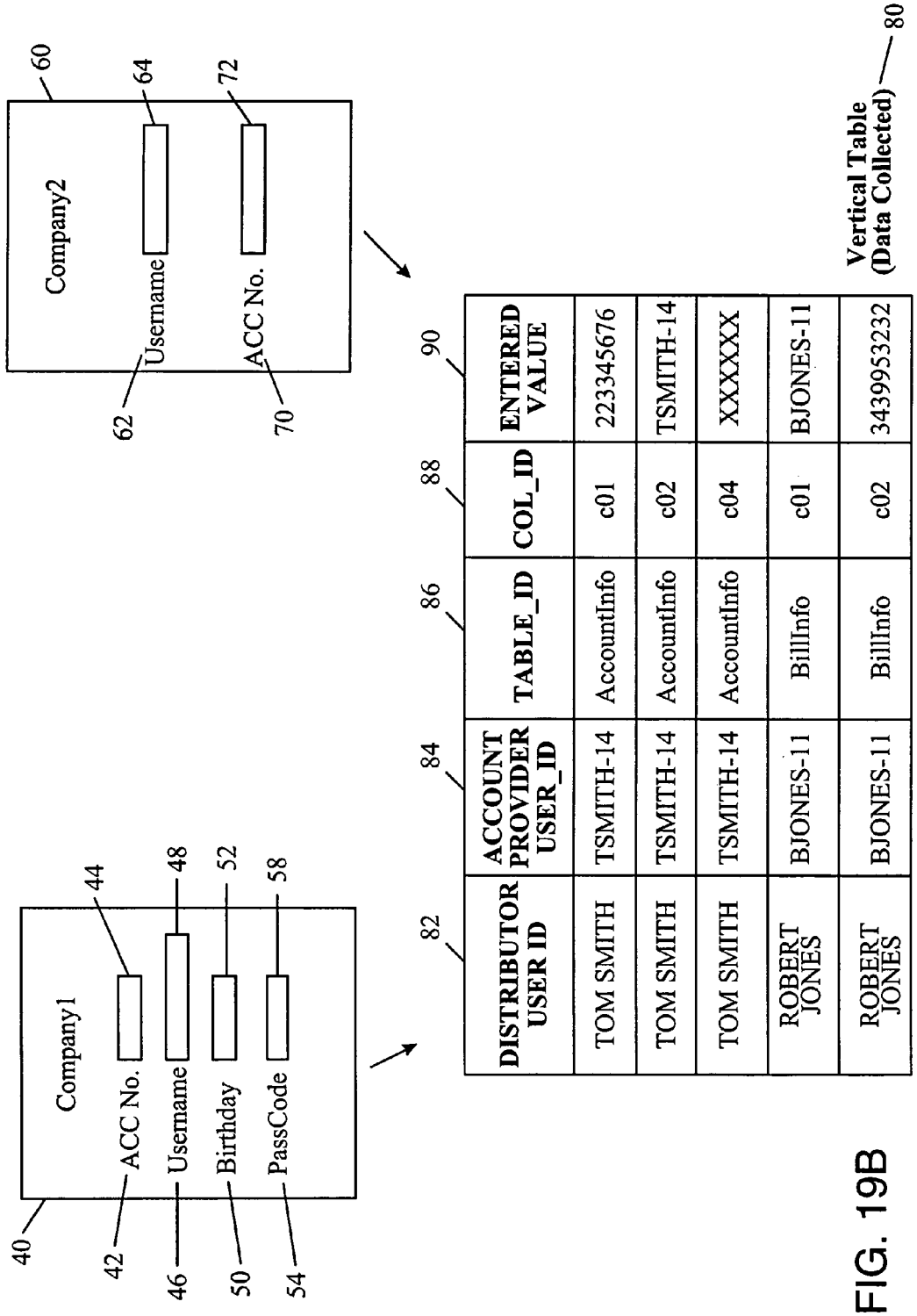
FIG. 19 shows an illustrative example of how a vertical table can describe a regular database table storing information to be displayed inside of a form.

FIG. 19 shows an illustrative example of how a vertical table can describe a regular database table storing information to be displayed inside of a form. The column description vertical table 20 stores descriptions of two regular database tables, AccountInfo and BillInfo, supplied by billers "Company 1" and "Company 2" respectively and identified by values stored in the TABLE_ID vertical column 24. This vertical column indicates what regular table contains the regular column that a particular intersecting vertical row is describing.

The ENTITY_ID 22 vertical table column 22 indicates what association the TABLE_ID 24 of each intersecting vertical row has with a particular entity. In the billing context, an entity can be a particular biller, such as "Company 1" or "Company 2".

The COL_ID vertical table label 26 identifies that regular table columns residing inside the regular table identified by each TABLE_ID 24 value, is described by each intersecting vertical table row.

The TYPE vertical table column label 28 indicates the data type used to store values in the regular table column described by each intersecting vertical table row.

Likewise, the LENGTH vertical table column label 30, indicates the length of the data type is used to store values in the table column described by each intersecting vertical table row.

The ORDER vertical table column label 32, indicates the order in which the regular table column is processed by table dependent software, the JavaScript user interface software 1028, described by each intersecting vertical table row. In the context of forms, this order would represent the order of display within a form. For example, the order could indicate from top to bottom, or from left to the right side of the form.

The STATE vertical table column label 36 indicates the current status of the regular table column described by each intersecting vertical table row.

The "Active" status indicates that the regular table column described should be actively processed by the table dependent software. the "Inactive" status indicates that it should not be processed by the table dependent software. In the context of form display, an "Inactive" regular column value would not be displayed. Note that the column could be re-activated to the "Active" state some time after placing it into the "Inactive" state.

The REQUIRED vertical table column label 34 indicates if more actions are required to be performed apart from what is performed by the table dependent software, namely the JavaScript 1028, for each regular table column described by each intersecting vertical table row. In the form display context, this could indicate if the user is required to enter data into this displayed data entry field inside the displayed form. If the REQUIRED value equals NO, the user is not required to, but can optionally enter data into the associated displayed data entry field. Else, the user is required to enter data into this data entry field.

The LABEL vertical table column label 36 indicates the label associated with the regular table column described by each intersecting vertical table row. For the form display context, the label value could be displayed adjacent to the displayed data entry field associated with the regular table column row data type.

The displayed "Company1" form 40 associated with the entity "Company1", contains four fields (44 48 52 56) each with an adjacent label on its left side, (42 46 50 54) respectively. From top to bottom, the fields are displayed according to the order specified in the ORDER vertical column 32. Only the top most four rows of the column description vertical table 20, describe the regular table identified by TABLE_ID 24 associated with the displayed "Company 1" form 40.

Inside the form 40, the data entry fields appear as empty white horizontal rectangles. The dimension of each field is determined by the table dependent software and is independent of the values specified by the LENGTH vertical column 30. The LENGTH vertical column 30 specifies only the length of the data as stored, not the length of the associated data entry field used to receive data entered by the user.

As a practical matter, there is often a correlation between the length of the data as stored and the length of the associated data entry field receiving the entered data. To illustrate this, the top most field in the "Company 1" data entry form has a data storage length of 50 bytes, and has a displayed data entry field width shorter than all other data entry fields with data storage length of 255 bytes.

The displayed "Company 2" form 60 associated with entity "Company2", contains two fields (64 72) each with an adjacent label on its left side (62 70) respectively. From top to bottom, the fields are displayed according to the order specified in the ORDER vertical column 32. Only the three bottom most rows of the column description vertical table 20 describe the regular table associated with the displayed "Company 2" form 60. Note that "PassCode" regular table column, identified by LABEL 38, is "Inactive" and not displayed. Like form 40, the data entry fields appear as empty white horizontal rectangles. The dimension of each field is determined by the table dependent software and is independent of the values specified by the LENGTH vertical column 30. The LENGTH vertical column 30 specifies only the length of the data as stored, not the length of the data entry field used to receive it when entered by the user.

The collected data vertical table 80 stores information entered into the data entry fields residing inside the data entry forms for "Company 1" 40 and "Company 2" 60, by the user. The top most three rows of this table 80 correspond to three of the four topmost rows of the column description table 20. Note that no data was required to be entered into "PassCode" field by the user, and was not. Consequently, there is no entered data for this field in the collected data vertical table 80. The correspondence between the collected data vertical table 80 is indicated by the intersecting vertical table row TABLE_ID values 86 and the COL_ID values 88 which match those same values in the same vertical table columns in the column description vertical table 20.

The ENTERED VALUE vertical column 90, indicates the actual data values entered by the user associated with the regular table column described by each intersecting vertical table row, namely a particular user data entry field. Note that the "Company 2" birthday field is not required, indicated by a REQUIRED value 34 of "NO" and that no data was entered by the user for it.

The DISTRIBUTOR USER ID vertical table column label 82 and the ENTITY USER ID vertical table column label 84 are columns that are unique to the collected data vertical table 80 and not present in the column description table 20. Note that these two ID values are not necessarily the same, and can be different. In the billing context, the ENTITY USER ID 84 represents the user identification associated with the billing company, either "Company 1" or "Company 2". The DISTRIBUTOR USER ID represents the user identification associated with the distributor 102 company.

Both these ID related vertical columns 82 and 84, act as additional attributes associated with the regular table column that the intersecting vertical table row is describing, namely the particular user data entry field. Both these ID attributes identify the user entering the data for a particular field. Other attributes that are located in the column description vertical table 20 also apply to user data entry fields and include the "Company 1" account number, user name and birthday and the "Company 2" user name and account number as listed in the LABEL vertical table column 38.

This illustration shows how the column description vertical table 20 can enable displayed forms to dynamically adjust to structural changes made in other regular database tables that are supplied by billers and that are processed by and depended upon form display software such as the JavaScript user interface software 1028. Also, the collected data vertical table 80, can also adjust to the set of data actually collected by such interface software.

EQUIVALENTS

The invention may be embodied in other specific forms without departing from the spirit or essential characteristics thereof. The foregoing embodiments are therefore to be considered in all respects illustrative rather than limiting on the invention described herein. The scope of the invention is indicated by the appended claims rather than by the foregoing description, and all changes which come within the meaning and range of equivalency of the claims are therefore intended to be embraced therein.

What is claimed is:

1. A computerized method of providing billing information, comprising:
  receiving, over a communications network, a request for summary billing information, the request being automatically generated by a billing portal in response to an action by a billable entity associated with the billing portal;
  requesting, over the communications network and in response to said receiving the request for the summary billing information, the summary billing information from a supplier of the summary billing information;
  receiving, over the communications network, the summary billing information and detailed billing contact information of the supplier of the summary billing information, the detailed billing contact information specifying contact data for detailed billing information; and
  transmitting, over the communications network to the billing portal, the summary billing information and the detailed billing contact information, the detailed billing contact information to be usable by the billable entity to access the detailed billing information from a supplier of the detailed billing information.

2. The method of claim 1 further comprising:
  prior to said receiving the request for the summary billing information, providing software to the billing portal;
  wherein on the billing portal the software, in response to the action by the billable entity associated with the billing portal, exclusively causes the billing portal to transmit the request for the summary billing information and to receive the summary billing information and the detailed billing contact information.

3. The method of claim 2, wherein said providing the software comprises:
  transmitting, over the communications network, the software to the billing portal to effect delivery and installation of the software.

4. The method of claim 3, wherein the delivery, the installation, and operation of the provided software are automatic with respect to other human and machine activity at the billing portal.

5. The method of claim 4, wherein the software comprises one contiguous portion of dynamic HTML.

6. The method of claim 4, wherein the software comprises one contiguous portion of JavaScript.

7. The method of claim 4, wherein the software when in an uncompressed form has less than 80 bytes of information.

8. The method of claim 1 wherein the detailed billing contact information comprises a Uniform Resource Locator (URL) that directs access to the detailed billing information located on the Internet.

9. The method of claim 8 wherein the detailed billing contact information comprises an encrypted Uniform Resource Locator (URL) that authenticates an identity of one accessing information addressable by the Uniform Resource Locator.

10. The method of claim 1 further comprising:
  prior to said requesting the summary billing information, providing software to the supplier of the summary billing information;
  wherein on the supplier the software, in response to said requesting the summary billing information, causes the supplier to transmit the summary billing information over the communications network.

11. The method of claim 1, wherein
  the summary billing information is received from the supplier of the summary billing information in a first one of a plurality of different data formats; and the method further comprises:
  translating the summary billing information from the first one of a plurality of different data formats into a predetermined data format.

* * * * *